US011991449B2

(12) United States Patent
Nishio et al.

(10) Patent No.: US 11,991,449 B2
(45) Date of Patent: May 21, 2024

(54) IMAGING APPARATUS CAPABLE OF CHANGING THINNING-OUT RATES FOR DIFFERENT ANGLES OF VIEW

(71) Applicant: FUJIFILM Corporation, Tokyo (JP)

(72) Inventors: Yuya Nishio, Saitama (JP); Tetsu Wada, Saitama (JP); Koichi Tanaka, Saitama (JP); Yukinori Nishiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/838,250

(22) Filed: Jun. 12, 2022

(65) Prior Publication Data
US 2022/0303471 A1 Sep. 22, 2022

Related U.S. Application Data

(63) Continuation of application No. PCT/JP2020/042103, filed on Nov. 11, 2020.

(30) Foreign Application Priority Data

Dec. 19, 2019 (JP) .................. 2019-229114

(51) Int. Cl.
H04N 23/69 (2023.01)
H04N 23/58 (2023.01)
H04N 25/443 (2023.01)

(52) U.S. Cl.
CPC ............. *H04N 23/69* (2023.01); *H04N 23/58* (2023.01); *H04N 25/443* (2023.01)

(58) Field of Classification Search
CPC ...... H04N 23/69; H04N 23/58; H04N 25/443; H04N 23/667; H04N 23/672; H04N 5/2628; H04N 5/77; H04N 23/60; H04N 25/445
See application file for complete search history.

(56) References Cited

U.S. PATENT DOCUMENTS 6,304,277 B1 * 10/2001 Hoekstra ................. G06T 11/60
382/302
8,184,172 B2 5/2012 Nakaseko
(Continued)

FOREIGN PATENT DOCUMENTS

JP 2010093579 4/2010
JP 2010183558 8/2010
(Continued)

OTHER PUBLICATIONS

"International Search Report (Form PCT/ISA/210) of PCT/JP2020/042103," dated Feb. 2, 2021, with English translation thereof, pp. 1-5.
(Continued)

Primary Examiner — Gevell V Selby
(74) Attorney, Agent, or Firm — JCIPRNET

(57) ABSTRACT

Provided is an imaging apparatus that obtains a video with a resolution of satisfactory quality and a small angle of view from a video with a large angle of view through real-time image processing. An imaging apparatus has an imaging element that captures an optical image of a standard video with a first angle of view, and a control unit that includes a first mode and a second mode as a video imaging mode and records video data of a video based on the optical image. The control unit executes first recording processing of recording video data of the standard video using the imaging element in the first mode. The control unit executes setting processing of setting a recording region with a second angle of view smaller than the first angle of view in the standard video and second recording processing of recording a video data of a recorded video of the recording region in the second mode. In the first recording processing and the second recording processing, thinning-out drive to thin out a part of readout of a plurality of pixels in the optical image is executed. A second thinning-out rate of the thinning-out drive of the
(Continued)

second recording processing is set to be lower than a first thinning-out rate of the thinning-out drive of the first recording processing.

20 Claims, 19 Drawing Sheets

(56) References Cited

U.S. PATENT DOCUMENTS

| | | | | |
|---|---|---|---|---|
| 2014/0184855 | A1* | 7/2014 | Yanai | H04N 23/69 |
| | | | | 348/222.1 |
| 2015/0109515 | A1* | 4/2015 | Kobuse | H04N 23/651 |
| | | | | 348/349 |
| 2015/0146031 | A1* | 5/2015 | Kageyama | H04N 25/767 |
| | | | | 348/220.1 |
| 2016/0198115 | A1* | 7/2016 | Tsuchiya | H04N 25/44 |
| | | | | 348/294 |

FOREIGN PATENT DOCUMENTS

| | | |
|---|---|---|
| JP | 2014042357 | 3/2014 |
| JP | 2015103945 | 6/2015 |

OTHER PUBLICATIONS

"Written Opinion of the International Searching Authority (Form PCT/ISA/237)" of PCT/ JP2020/042103, dated Feb. 2, 2021, with English translation thereof, pp. 1-10.

* cited by examiner

IMAGING APPARATUS CAPABLE OF CHANGING THINNING-OUT RATES FOR DIFFERENT ANGLES OF VIEW

CROSS-REFERENCE TO RELATED APPLICATIONS

This application is a Continuation of PCT International Application No. PCT/JP2020/042103 filed on Nov. 11, 2020, which claims priority under 35 U.S.C. § 119(a) to Japanese Patent Application No. 2019-229114 filed on Dec. 19, 2019. The above application is hereby expressly incorporated by reference, in its entirety, into the present application.

BACKGROUND OF THE INVENTION

1. Field of the Invention

An embodiment of the present invention relates to an imaging apparatus that captures a motion image, and in particular, to an imaging apparatus that processes a motion image to obtain a video with a small angle of view from the motion image in real time.

2. Description of the Related Art

Imaging a video is executed by, for example, an imaging apparatus, such as a digital camera. At present, with an increase in the number of pixels of an imaging element, such as a complementary metal oxide semiconductor (CMOS) sensor, a video, which is a motion image, captured by one imaging element is processed to cut a part of an angle of view in a digital manner, and a video with a small angle of view can be obtained.

SUMMARY OF THE INVENTION

An object of an embodiment of the present invention is to provide an imaging apparatus that obtains a video with a resolution of satisfactory quality and a small angle of view from a video with a large angle of view through real-time image processing.

To attain the above-described object, an embodiment of the present invention provides an imaging apparatus comprising an imaging element that captures an optical image of a standard video with a first angle of view and has a pixel region where a plurality of pixels are arranged in a first direction and a second direction crossing the first direction, and a control unit that has a first mode and a second mode as a video imaging mode and records video data of a video based on the optical image, in which the control unit executes first recording processing of recording video data of the standard video using the imaging element in the first mode, the control unit executes setting processing of setting a recording region with a second angle of view smaller than the first angle of view in the standard video and second recording processing of recording video data of a recorded video of the recording region in the second mode, the control unit executes thinning-out drive to thin out a part of readout of the plurality of pixels in the optical image in the first recording processing and the second recording processing, and the control unit sets a second thinning-out rate in the thinning-out drive of the second recording processing to be lower than a first thinning-out rate of the thinning-out drive of the first recording processing.

It is preferable that the control unit changes the second thinning-out rate of the recording region with change in the second angle of view, in the second mode.

It is preferable that the imaging element changes an input resolution of the recorded video of the recording region input to the control unit with the change in the second thinning-out rate of the control unit, and the control unit reduces the input resolution to match an output resolution of the video data in a case where the input resolution is higher than the output resolution and complements the input resolution to match the output resolution in a case where the input resolution is lower than the output resolution.

It is preferable that the imaging apparatus further comprises an imaging lens having a zoom function, the imaging element receives light transmitted through the imaging lens to capture the optical image of the standard video with the first angle of view, and the control unit performs notification regarding the zoom function to a user in a case where the input resolution is lower than a set resolution.

It is preferable that the control unit executes setting processing of setting a plurality of video regions with the second angle of view in the standard video and selection processing of selecting the recording region from the plurality of video regions, in the second mode, and the second recording processing combines the recorded video before selection and the recorded video after selection in the selection processing to record video data.

It is preferable that each of the pixels has a photoelectric conversion element and a switch part, a pixel circuit including a plurality of first wires extending in the first direction and a plurality of second wires extending in the second direction is provided, the first wires and the second wires are electrically connected to the switch parts, the control unit supplies a drive signal to the switch parts through the first wires, such that a video signal based on the photoelectric conversion element is output to the second wires in response to the drive signal, the control unit executes the thinning-out drive to divide the pixel region into a drive region where the drive signal is supplied to the switch parts through the first wires and that consists of the pixels and a non-drive region other than the drive region, in the first direction, and the control unit records the recorded video using the drive region and correlates the non-drive region with the video regions other than the recording region in the second recording processing.

It is preferable that the control unit moves a position of the recording region in the standard video or changes the second angle of view of the recording region following movement of a subject in the recording region in the second recording processing, and the control unit changes a position or a width of the drive region in the pixel region following the movement of the position of the recording region or the change in the second angle of view.

It is preferable that the control unit decides the second thinning-out rate based on the smallest second angle of view among the second angles of view of the plurality of video regions.

It is preferable that the control unit executes detection processing of detecting movement of a subject in the plurality of video regions including the recording region, the control unit executes the second recording processing multiple times and executes the detection processing between the plurality of times of the second recording processing, and in the detection processing, the control unit acquires a detection video with an angle of view including the recording region and at least one video region and moves at least one of the plurality of video regions or changes the second angle of view following the movement of the subject.

It is preferable that a first imaging element as the imaging element that captures the optical image of the recorded video in the first recording processing and the second recording processing and a second imaging element that is different from the first imaging element and acquires videos of a plurality of corresponding regions corresponding to the plurality of video regions including the recording region are provided, the control unit executes detection processing of detecting movement of a subject in the plurality of corresponding regions, and in the detection processing, the control unit performs control such that the second imaging element acquires a detection video with an angle of view including the plurality of corresponding regions and moves at least one of the plurality of video regions or changes the angle of view following the movement of the subject.

It is preferable that the video data includes no data representing the detection video.

It is preferable that a pixel resolution of the pixel region of the imaging element is 70,000,000 or more.

An embodiment of the present invention provides an imaging apparatus comprising an imaging element that captures an optical image of a standard video with a first angle of view and has a pixel region where a plurality of pixels are arranged in a first direction and a second direction crossing the first direction, and a control unit that records video data of a video based on the optical image captured by the imaging element, in which the control unit executes setting processing of setting a plurality of video regions with a second angle of view smaller than the first angle of view in the standard video, decision processing of deciding a recording region from among the plurality of video regions, readout processing of reading out a video signal of the pixel region corresponding to the recording region, and recording processing of recording video data of a recorded video of the recording region, the control unit thins out pixels in the first direction and the second direction to read out the video signal of a partial region of the pixel region corresponding to the recording region in the readout processing, and the control unit records a video of the partial region as a recording target in the recording processing.

It is preferable that the control unit changes a thinning-out rate of thinning-out drive to thin out a part of readout of the plurality of pixels of the recording region with change in the second angle of view in the readout processing.

It is preferable that a pixel resolution of the pixel region of the imaging element is 70,000,000 or more.

DESCRIPTION OF THE PREFERRED EMBODIMENTS

Hereinafter, an imaging apparatus of an embodiment of the present invention will be described in detail based on a preferred embodiment shown in the accompanying drawings.

The drawings described below are exemplary for describing the embodiment of the present invention, and the embodiment of the present invention is not limited to the drawings shown below.

Hereinafter, the expression "to" indicating a numerical value range includes numerical values described on both sides. For example, in a case where ε is a numerical value α to a numerical value β, the range of E is a range including the numerical value a and the numerical value β and is α≤ε≤β in mathematical symbols.

An angle, such as "vertical" and "perpendicular", includes an error range that is generally allowable in the corresponding technical field unless particularly stated. The expression "entire surface" or the like includes an error range that is generally allowable in the corresponding technical field.

First Example of Imaging Apparatus

Figure 1:
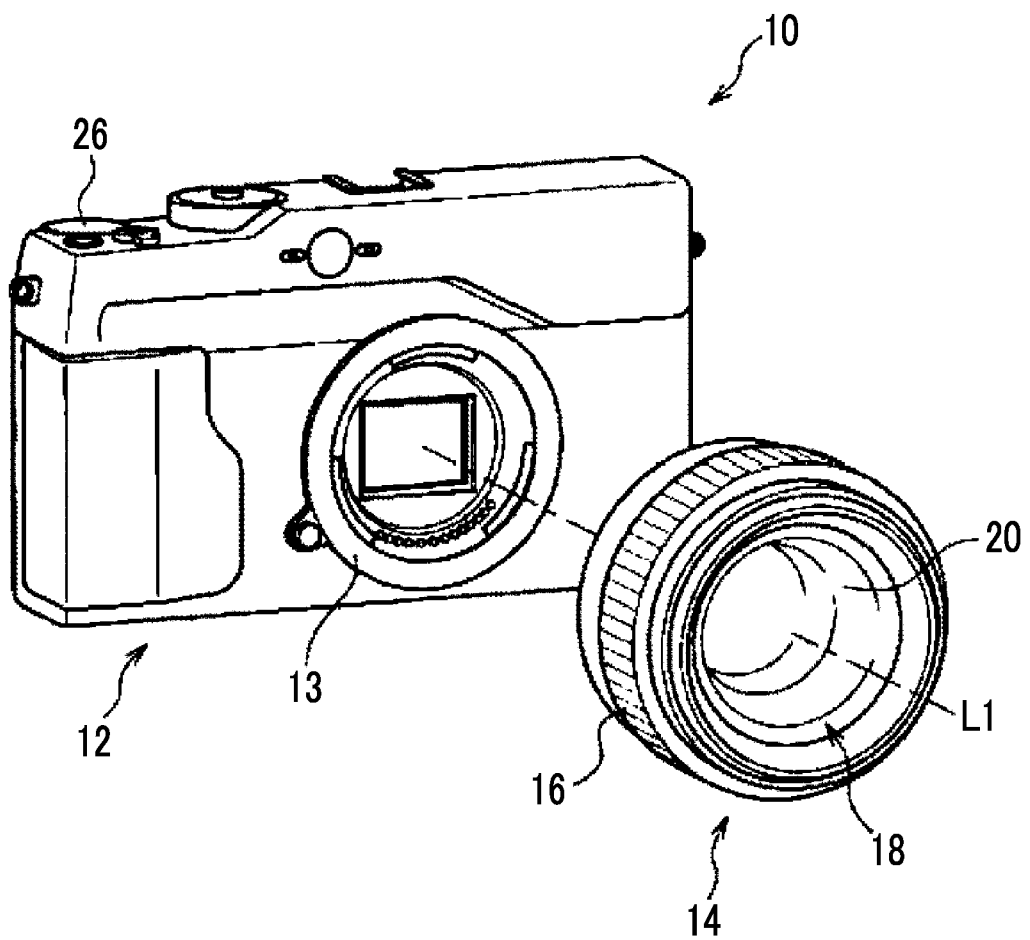
FIG. 1 is a perspective view showing a first example of an imaging apparatus of an embodiment of the present invention.
Figure 2:
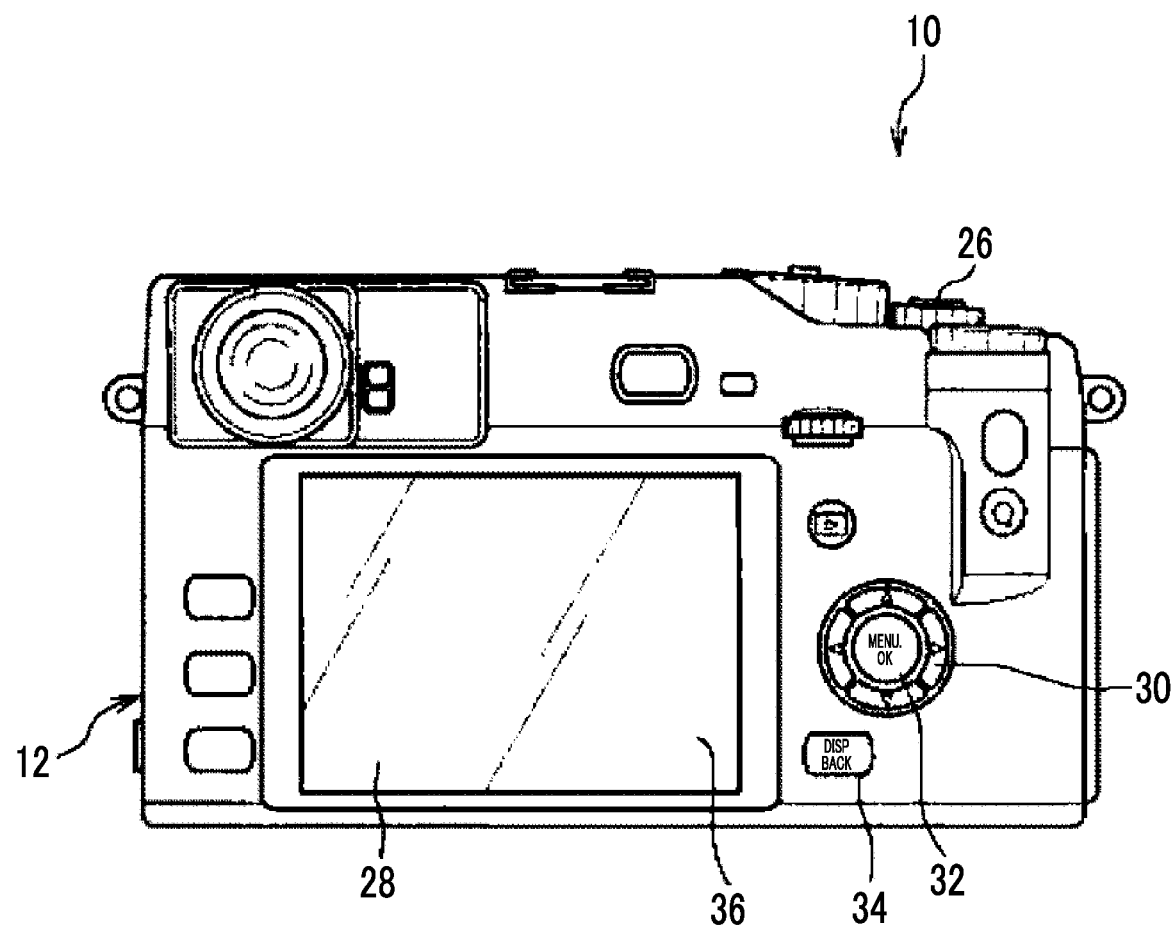
FIG. 2 is a rear view showing a rear surface side of the first example of the imaging apparatus of the embodiment of the present invention.
Figure 3:
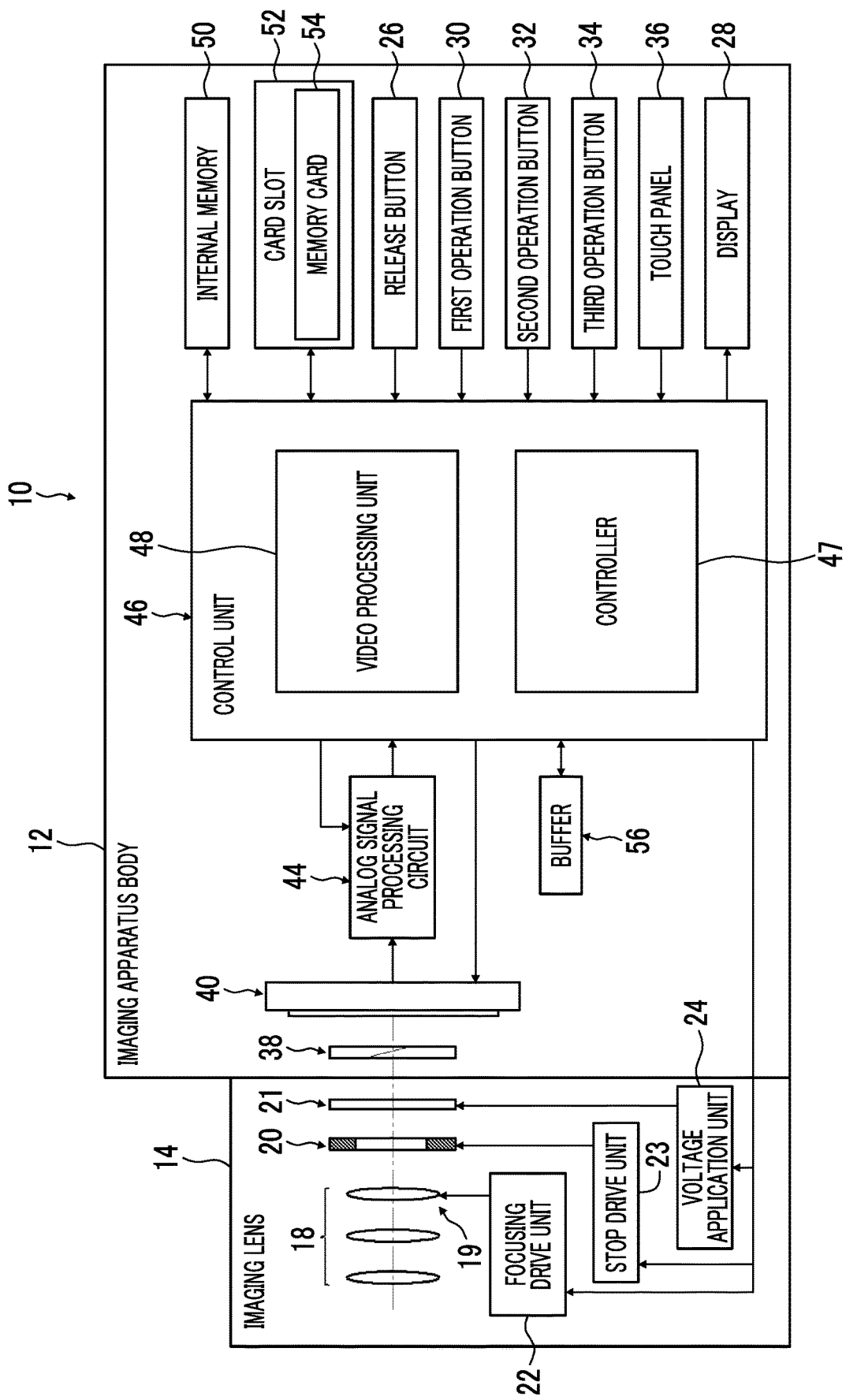
FIG. 3 is a block diagram showing the configuration of the first example of the imaging apparatus of the embodiment of the present invention.

FIG. 1 is a perspective view showing a first example of an imaging apparatus of an embodiment of the present invention, FIG. 2 is a rear view showing a rear surface side of the first example of the imaging apparatus of the embodiment of the present invention, and FIG. 3 is a block diagram showing the configuration of the first example of the imaging apparatus of the embodiment of the present invention.

[Basic Configuration of Imaging Apparatus]

An imaging apparatus 10 is a digital camera and is used in video imaging. The imaging apparatus 10 has a function of capturing a static image and a motion image. The imaging apparatus 10 also has a function of displaying a captured image (video) and recording the video. The imaging apparatus 10 has a function of executing various kinds of signal processing, such as image processing, on a video as a motion image in real time.

In the following description, the term "video" means a live video (live view image), that is, a video that is captured in real time unless otherwise specified.

The imaging apparatus 10 shown in FIGS. 1 and 2 is a lens-interchangeable digital camera and comprises an imaging apparatus body 12 and an imaging lens 14. The imaging lens 14 is interchangeably mounted on a mount 13 of the imaging apparatus body 12. The present invention is not limited thereto, and the imaging apparatus 10 may be a lens-integrated digital camera.

(Imaging Lens)

As shown in FIG. 3, the imaging lens 14 includes an optical component unit 18, a stop 20, an electronic light reduction filter 21, a focusing drive unit 22, a stop drive unit 23, and a voltage application unit 24.

The optical component unit 18 has a plurality of lenses, and a focusing optical component 19 (focus lens) is included in the plurality of lenses. In a case where the focusing optical component 19 moves toward an optical axis L1 (see FIG. 1), the focus of the imaging lens 14 changes.

The optical component unit 18 includes a wide angle lens, a super-wide angle lens, a 360-degree lens, an anamorphic lens, and the like. With this, the imaging apparatus 10 can image a video with a wide angle of view in a lateral direction. Here, a maximum angle of view in a case where the imaging apparatus 10 images a video is a first angle of view. For this reason, the first angle of view id decided depending on the optical component unit 18 imaged with a maximum number of pixels of the imaging apparatus 10, the use of an imaging element 40 described below, and the like. An optical image captured with the first angle of view as described above is a standard video A1 (see FIG. 4).

The imaging apparatus 10 may comprise a plurality of optical component units 18 having different angles of view.

The stop 20 is an optical component that is disposed in an optical path of the imaging lens 14, has a variable opening shape, and adjusts a stop amount (specifically, a stop value or an F-Number) with respect to incident light on the imaging lens 14.

In the embodiment, the opening shape of the stop 20 is changed by mechanically driving a member for changing the size of the opening. The present invention is not limited thereto, and a stop (physical stop) in which the opening shape is changed by driving a liquid crystal or electrochromic element may be employed. The opening shape of the stop 20, that is, the stop amount is adjusted by the stop drive unit 23.

(Imaging Apparatus Body)

As shown in FIGS. 1 and 2, the imaging apparatus body 12 comprises an operating unit that is operated by a user. For example, a release button 26 is disposed on a top surface of the imaging apparatus body 12. For example, in a case where the user fully pushes the release button 26, recording of a video that is imaged by the imaging apparatus 10 or a video based on an imaged video is started. Examples of the video based on the imaged video include a recorded video of a recording region described below. A release instruction of the user may be input to a control unit 46 through a touch detection function of a display 28 described below.

On a rear surface of the imaging apparatus body 12, the display 28 that configures a display screen is disposed, and a plurality of buttons are disposed around the display 28.

The display 28 is configured of, for example, a liquid crystal display (LCD), an organic electroluminescence (organic EL) display, a light emitting diode (LED) display, or an electronic paper. A video that is imaged by the imaging apparatus 10, a video based on the imaged video, or the like is displayed on the display screen of the display 28.

A selection menu regarding imaging conditions and the like, notification information to the user including a warning and the like, a reproduced video of a video acquired in the past, or the like is also displayed on the display screen of the display 28.

The display 28 includes a function of detecting a touch of a finger of the user. In the embodiment, the display 28 has a transmissive touch panel 36 that is superimposed thereon. The touch panel 36 detects a touch position and a displacement of the finger of the user, a stylus pen, or the like and outputs a signal based on a detection result to a predetermined output destination. The touch panel 36 may be incorporated inside the display 28.

In a housing of the imaging apparatus body 12, as shown in FIG. 3, an optical shutter 38, the imaging element 40, an analog signal processing circuit 44, the control unit 46, an internal memory 50, a card slot 52, and a buffer 56 are provided.

The optical shutter 38 is, for example, a focal plane shutter disposed just ahead the imaging element 40. The optical shutter 38 is maintained in an open state at the time of preview, and is closed once just before an exposure operation for capturing a static image is performed. Thereafter, in a case where a front curtain and a rear curtain in the focal plane shutter run and exposure (shutter opening and closing operation) is performed, the optical shutter 38 is maintained in the open state again. As the optical shutter 38, a mechanical shutter, such as a diaphragm shutter, or a liquid crystal shutter may be used instead of the focal plane shutter.

Figure 4:
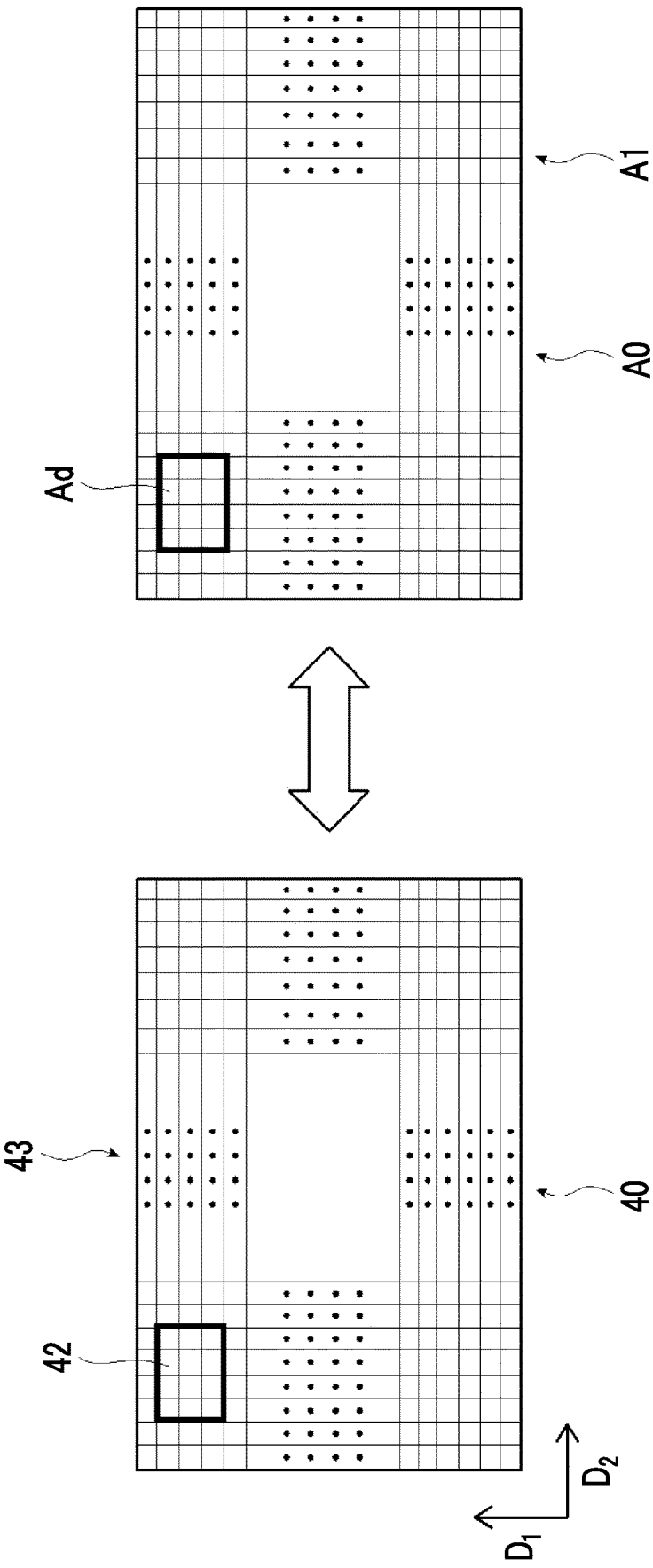
FIG. 4 is a schematic view showing a correspondence relationship between pixels of an imaging element of the imaging apparatus of the embodiment of the present invention and an imaging region of a standard video.

The imaging element 40 captures an optical image of a standard video with a first angle of view, and has an image sensor. Examples of the image sensor include a solid-state imaging element, such as a charged coupled device (CCD) or a CMOS. As shown in FIG. 4, the imaging element 40 has a pixel region 43 where a plurality of unit pixels 42 are arranged in a first direction $D_1$ and a second direction $D_2$ crossing the first direction $D_1$. In the imaging element 40, each of a plurality of unit pixels 42 may have an on-chip microlens and a color filter. It is preferable that a pixel resolution of the pixel region 43 of the imaging element 40 is 70,000,000 or more. In a case where the pixel resolution of the pixel region 43 is 70,000,000 or more, the standard video is a video with high image quality, and even though a plurality of video regions are set for one standard video, each recording region has a sufficient resolution. For this reason, the visibility of a recording region obtained from the standard video is secured. An upper limit of the pixel resolution is not particularly limited, but may be preferably 1,000,000,000 or less, and more preferably may be 500,000,000 or less. The detailed configuration of the imaging element 40 will be described below.

FIG. 4 shows a correspondence relationship between a plurality of unit pixels 42 of the imaging element 40 and an imaging region A0. The standard video A1 is a video shown in the imaging region A0 imaged with the first angle of view by the imaging apparatus 10. The standard video A1 shown in the imaging region A0 is configured of a plurality of unit pixels 42, and is a maximum of the same number of pixels as the pixel region 43.

As shown in FIG. 4, each of a plurality of unit pixels 42 corresponds to one of unit regions Ad that configure the standard video A1. The unit region Ad is a region that makes a minimum unit in the standard video A1, and is configured of a plurality of pixels.

The imaging element 40 receives light from a subject transmitted through the imaging lens 14 to form an image, converts the optical image into an electric signal (pixel signal), and outputs the electric signal. The imaging element 40 is configured such that the exposure operation by the shutter in the imaging element can be executed. That is, with the shutter function, while the optical shutter 38 is maintained in the open state, photoelectric conversion and electric charge storage can be performed in a controlled time. An exposure time by the shutter can be adjusted. The imaging apparatus 10 may comprise, for example, an imaging lens (not shown) having a zoom function. In a case where the imaging apparatus 10 comprises an imaging lens having a zoom function, the imaging element receives light transmitted through the imaging lens having a zoom function and captures an optical image of a subject. That is, the optical image of the standard video with the first angle of view is captured.

In the following description, the term "exposure" means that exposure by the shutter is performed in the imaging element 40 while the optical shutter 38 is maintained in the open state unless otherwise specified. The "exposure time" is an exposure time by the shutter, and is strictly an electric charge storage time.

In FIG. 3, the analog signal processing circuit 44 converts the analog electric signal (pixel signal) output from the imaging element 40 into a digital signal, and the processed signal is sent to a video processing unit 48 of the control unit 46. The converted digital signal is obtained by digitizing the pixel signal obtained in the imaging element 40 and corresponds to digital image data of a frame image that configures a standard video as a motion image. The pixel signal is also referred to a video signal because of a signal for representing a video finally. The analog signal processing circuit 44 may be incorporated in a column processing unit 113 of FIG. 5 described below.

The control unit 46 controls each unit of the imaging apparatus 10 and executes various kinds of processing regarding creation of a video file. As shown in FIG. 3, the control unit 46 includes a controller 47 and the video processing unit 48. For example, the control unit 46 stores a control program (not shown) that controls each unit of the imaging apparatus 10 and executes thinning-out processing described below and various kinds of processing regarding creation of a video file, in the internal memory 50. The control unit 46 reads out the control program from the internal memory 50 and executes the control program.

In the embodiment, the control unit 46 has, for example, one or a plurality of processors for executing the control program. As the processor, a central processing unit (CPU), a field programmable gate array (FPGA), a digital signal processor (DSP), an application specific integrated circuit (ASIC), a graphics processing unit (GPU), or other integrated circuits (ICs) can be used, and the processor may be configured by combining such ICs.

As represented by System on Chip (SoC) or the like, the above-described processor may be configured such that all functions of the control unit 46 including the controller 47 and the video processing unit 48 are implemented into one integrated circuit (IC) chip.

The hardware configuration of each processor listed above may be realized by an electric circuit (Circuitry) in which circuit elements, such as semiconductor elements, are combined.

The controller 47 integrally controls the imaging apparatus 10 following a user's operation or a prescribed control pattern. For example, the controller 47 performs control such that the imaging element 40 and the analog signal processing circuit 44 described above images a video (motion image) at a predetermined frame rate. The control unit 46 includes a first mode and a second mode as a video imaging mode. The controller 47 controls selection of the first mode and the second mode as the video imaging mode and switching between the first mode and the second mode. The controller 47 also controls thinning-out drive to thin out a part of readout of a plurality of pixels in the optical image obtained in the imaging element 40.

The controller 47 decides imaging conditions depending on an imaging environment and controls the imaging element 40, the analog signal processing circuit 44, and the video processing unit 48 such that the imaging conditions match the decided conditions. The imaging conditions include an exposure amount in imaging a video, white balance, the focus of the imaging lens 14, and the like.

The controller 47 performs control such that the video processing unit 48 records an imaged video or a video based on an imaged video on a recording medium.

The video processing unit 48 executes various kinds of processing, such as gamma correction, white balance correction, and defect correction, on the digital image data output from the analog signal processing circuit 44. The video processing unit 48 compresses the digital image data after the processing in a compression format conforming to a predetermined standard.

Then, the video processing unit 48 generates compressed digital image data at a specific frame rate during imaging of a video and acquires a video (strictly, a frame image) from the data. The video (frame image) acquired in this case corresponds to the video imaged with the first angle of view described above, that is, the standard video.

The video processing unit 48 executes various kinds of processing (for example, setting processing described below) on the acquired video and outputs the video after the processing to the display 28 at a specific frame rate for each frame under the control of the controller 47.

The video processing unit 48 records the video after the processing on the recording medium and creates a video file of the video. The video processing unit 48 includes a function of creating a video file in this way, such that the imaging apparatus 10 having the video processing unit 48 is used as a video creation apparatus in the embodiment.

Hereinafter, unless otherwise specified, the operation and the processing of each of the controller 47 and the video processing unit 48 will be described as the operation and the processing of the control unit 46. The processing of the control unit 46 will be described in a later section in detail.

The internal memory 50 incorporated in the imaging apparatus body 12 and a memory card 54 that is attachable and detachable to and from the imaging apparatus body 12 through the card slot 52 are recording mediums, and the control unit 46 records a video therein.

The internal memory 50 and the memory card 54 may be provided outside the imaging apparatus body 12, and in this case, the control unit 46 may record a video on an external recording medium in a wired or wireless manner. The buffer 56 functions as a work memory of the control unit 46. Next, the imaging element 40 will be specifically described.

(Configuration of Imaging Element)

Figure 5:
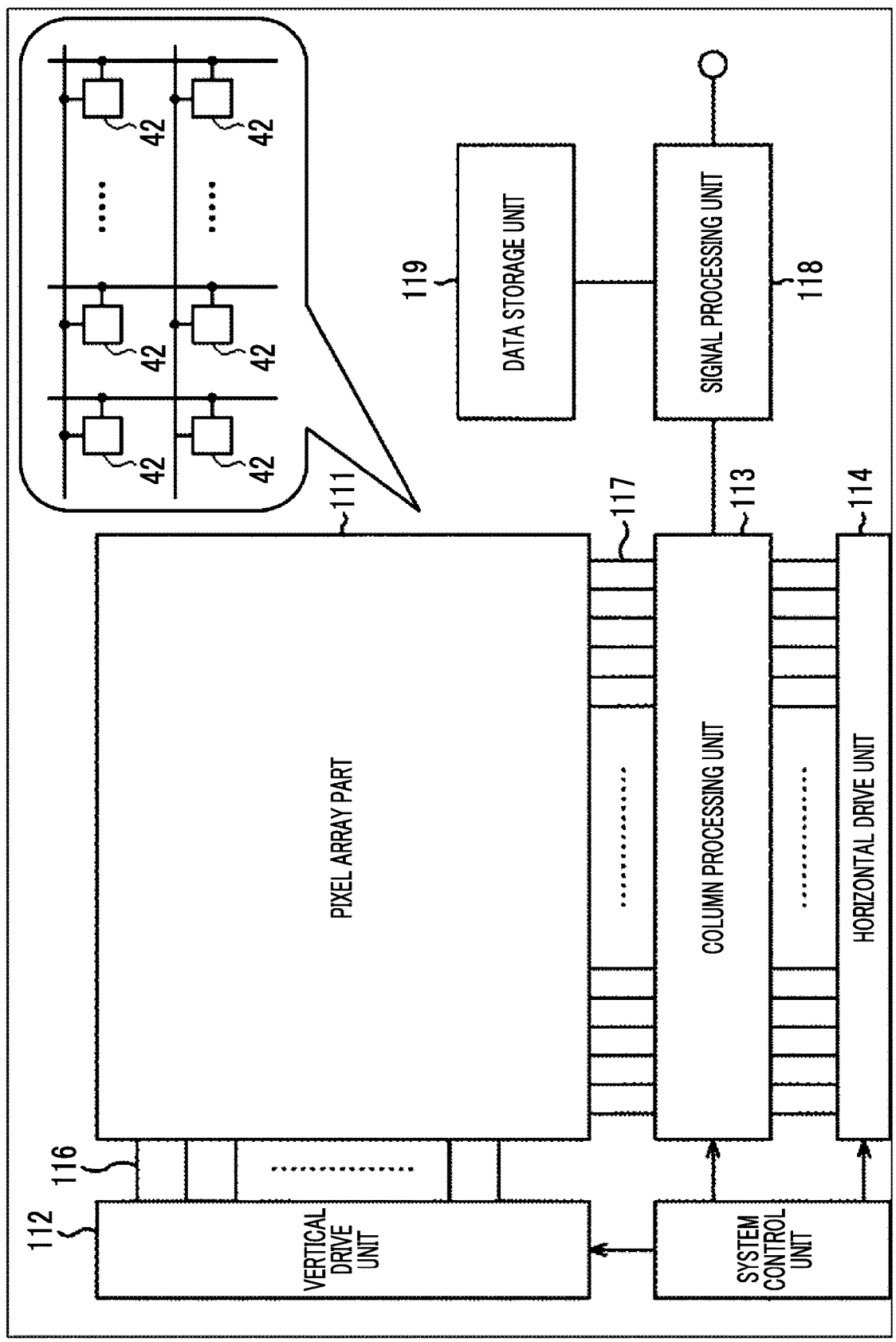
FIG. 5 is a schematic view showing the configuration of an imaging element of the first example of the imaging apparatus of the embodiment of the present invention.

FIG. 5 shows a configuration example of the imaging element 40. The imaging element 40 shown in FIG. 5 is, for example, a CMOS image sensor that is a kind of an X-Y address type imaging apparatus. Here, the CMOS image sensor is an image sensor that is created by applying a CMOS process or partly using a CMOS process.

The imaging element 40 shown in FIG. 5 has a pixel array part 111 including a plurality of unit pixels 42 formed on a semiconductor substrate, and a peripheral circuit part integrated on the same semiconductor substrate as the pixel array part 111. The peripheral circuit part is configured of, for example, a vertical drive unit 112, the column processing unit 113, a horizontal drive unit 114, and a system control unit (the control unit 46 of FIG. 3).

The imaging element 40 further comprises a signal processing unit 118 and a data storage unit 119. The signal processing unit 118 and the data storage unit 119 may be mounted on the same substrate as the imaging element 40 or may be disposed on a substrate different from the imaging element 40. Processing of the signal processing unit 118 and the data storage unit 119 may be processing by an external signal processing unit provided on a substrate different from the imaging element 40, for example, a digital signal processor (DSP) circuit or software.

The pixel array part 111 has a configuration in which the unit pixels 42 (hereinafter, simply referred to as "pixels") each having a photoelectric conversion unit that generates and stores electric charge of light depending on an amount of received light are two-dimensionally disposed in a row direction and a column direction, that is, in a matrix. Here, the row direction refers to an arrangement direction (that is, a horizontal direction) of pixels of pixel rows, and the column direction refers to an arrangement direction (that is, a vertical direction) of pixels of pixel columns.

In the pixel array part 111, regarding the pixel arrangement in a matrix, a pixel drive line 116 is wired along the row direction for each pixel row and a vertical signal line 117 is wired along the column direction for each pixel column. The pixel drive line 116 transmits a drive signal for performing drive in reading out a signal from a pixel. In FIG. 5, although the pixel drive line 116 is shown as one wire, the number of pixel drive lines 116 is not limited to one. An end of the pixel drive line 116 is connected to an output end corresponding to each row of the vertical drive unit 112.

The vertical drive unit 112 is configured of a shift register, an address decoder, or the like, and the pixels of the pixel array part 111 are driven simultaneously, in units of rows, or the like. That is, the vertical drive unit 112 configures a drive unit that drives the pixels of the pixel array part 111, along with the system control unit that controls the vertical drive unit 112. Although a specific configuration is not shown, in general, the vertical drive unit 112 has two scanning systems of a readout scanning system and a sweep scanning system.

The readout scanning system selectively scans the unit pixels 42 of the pixel array part 111 in order in units of rows to read out signals from the unit pixels 42. A signal read out from the unit pixel 42 is an analog signal. The sweep scanning system performs sweep scanning on a row to be read out where the readout scanning is performed by the readout scanning system, earlier than the readout scanning by a time of a shutter speed.

With the sweep scanning by the sweep scanning system, unnecessary electric charge is swept out from the photoelectric conversion unit of each unit pixel 42 of the row to be read out, whereby the photoelectric conversion unit is reset. Then, with sweeping (resetting) of unnecessary electric charge by the sweep scanning system, a so-called electronic shutter operation is performed.

The signal output from each unit pixel 42 of the pixel row selectively scanned by the vertical drive unit 112 is input to the column processing unit 113 through each vertical signal line 117 for each pixel column. The column processing unit 113 executes predetermined signal processing on the signal output from each pixel 42 of the selected row through the vertical signal line 117 for each pixel column of the pixel array part 111 and temporarily holds the pixel signal after the signal processing.

Specifically, the column processing unit 113 executes noise removal processing, for example, correlated double sampling (CDS) processing as the signal processing. With the CDS processing by the column processing unit 113, reset noise and fixed pattern noise peculiar to a pixel, such as threshold value variation of an amplification transistor in the pixel, are removed. The column processing unit 113 may be configured to have, for example, an analog-digital (AD) conversion function in addition to the noise removal processing, and may convert an analog pixel signal into a digital signal and may output the digital signal.

The horizontal drive unit 114 is configured of a shift register, an address decoder, or the like, and selects a unit circuit corresponding to the pixel column of the column processing unit 113 in order. With the selective scanning by the horizontal drive unit 114, the pixel signals subjected to the signal processing are output to the unit circuits in the column processing unit 113 in order.

The system control unit is configured of a timing generator that generates various timing signals, or the like, and performs drive control of the vertical drive unit 112, the column processing unit 113, the horizontal drive unit 114, and the like based on various timing signals generated by the timing generator.

The signal processing unit 118 has at least a calculation processing function and executes various kinds of signal processing, such as calculation processing, on the pixel signal output from the column processing unit 113. The data storage unit 119 temporarily stores data necessary for processing at the time of the signal processing in the signal processing unit 118.

(Thinning-Out Processing)

The imaging element 40 shown in FIG. 5 can perform imaging with total pixel readout of reading out the pixel signals of all the pixels 42 of the pixel region 43, for example, in a predetermined order, such as a raster scanning order, and can perform thinning-out readout. The total pixel readout enables imaging with a high resolution using all the pixels 42 of the pixel region 43.

The thinning-out readout is, for example, skipping the signals of the pixels 42 in a period set for the pixel region 43 and reading out the signals from the remaining pixels. The thinning-out readout is, for example, reading out the signals of a plurality of pixels 42 from the pixel region 43, thinning out the signals of a part of pixels in the analog signal processing circuit 44 or the like, and outputting a video. The thinning-out readout includes "thinning-out readout by addition" for reducing the number of signals by reading out signals of a plurality of pixels while adding the signals. In the thinning-out readout, since the pixels to be read out of the pixel region 43 can be reduced, readout can be performed in a shorter time than the total pixel readout. Accordingly, the thinning-out readout is effective in a case of performing high-speed imaging while a resolution is degraded and in a case of performing imaging with low power consumption. The thinning-out readout is referred to as thinning-out processing. In both the first mode and the second mode, the thinning-out processing is performed. The thinning-out processing is performed on the standard video with the first angle of view and a recorded video with a second angle of view. In regard to the recorded video of the recording region with the second angle of view, called a clop video, a thinning-out rate is lowered compared to the standard video, that is, a greater number of rows to be read out are read out than the standard video. The above-described thinning-out readout is thinning-out drive.

The thinning-out readout includes ½ thinning-out, ¼ thinning-out, and the like depending on a thinning-out rate. Here, the thinning-out rate is a decrease proportion of pixels of the pixel region of the imaging element corresponding to a video region to be recorded. For example, the thinning-out rate represents a rate of the number of rows to be read out in a first direction $D_1$ (see FIG. 6) of the pixel region 43, that is, in a vertical direction V (see FIG. 6) in the imaging element 40. For example, the ½ thinning-out is thinning-out readout where the number of rows to be read out in the vertical direction is thinned out to ½ of the total. A rate of the number of rows to be read out in the second direction D2 (see FIG. 7) of the pixel region 43, that is, in a horizontal direction H (see FIG. 7) is also referred to as a thinning-out rate.

Figure 6:
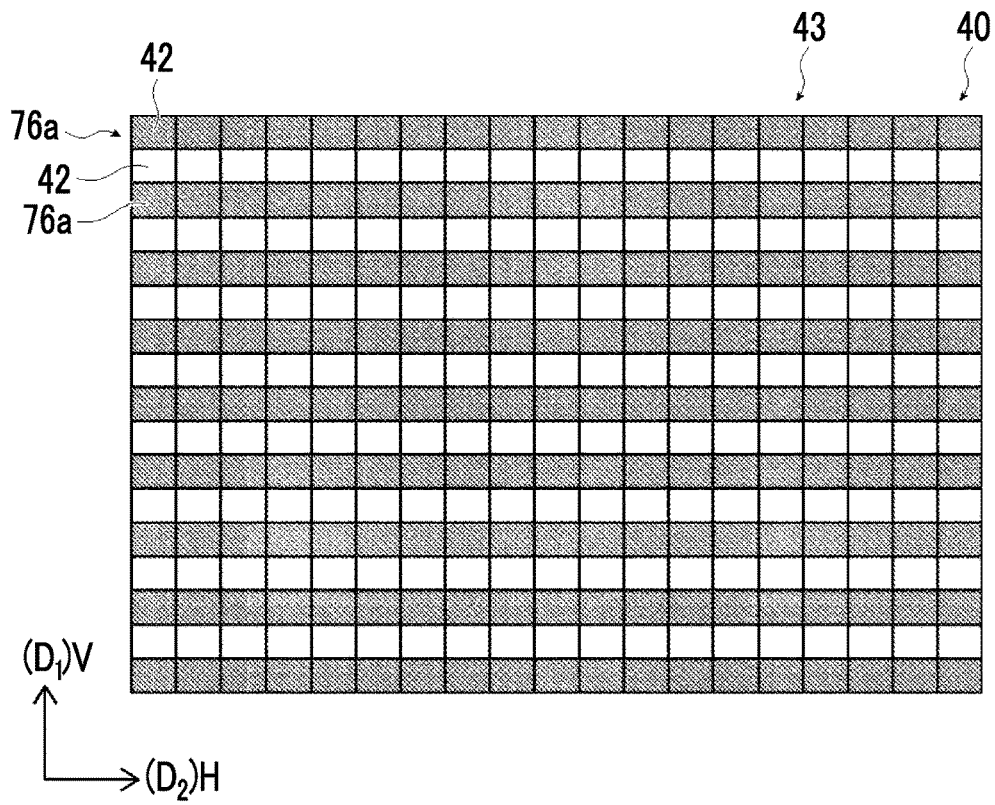
FIG. 6 is a schematic view showing a first example of thinning-out of the imaging element of the first example of the imaging apparatus of the embodiment of the present invention.

In the following description, the thinning-out processing will be described with thinning-out processing where a specific pixel is skipped, as an example. For example, in the ½ thinning-out, as shown in FIG. 6, after a row 76a of a pixel 42 to be initially read out in the pixel region 43 of the imaging element 40 is read out, a row 76a of the pixel 42 advanced from the pixel 42 by one pixel in the vertical direction V, that is, in the row direction is read out. In this case, the resolution of ½ thinning-out is ½ of the total pixel readout.

Figure 7:
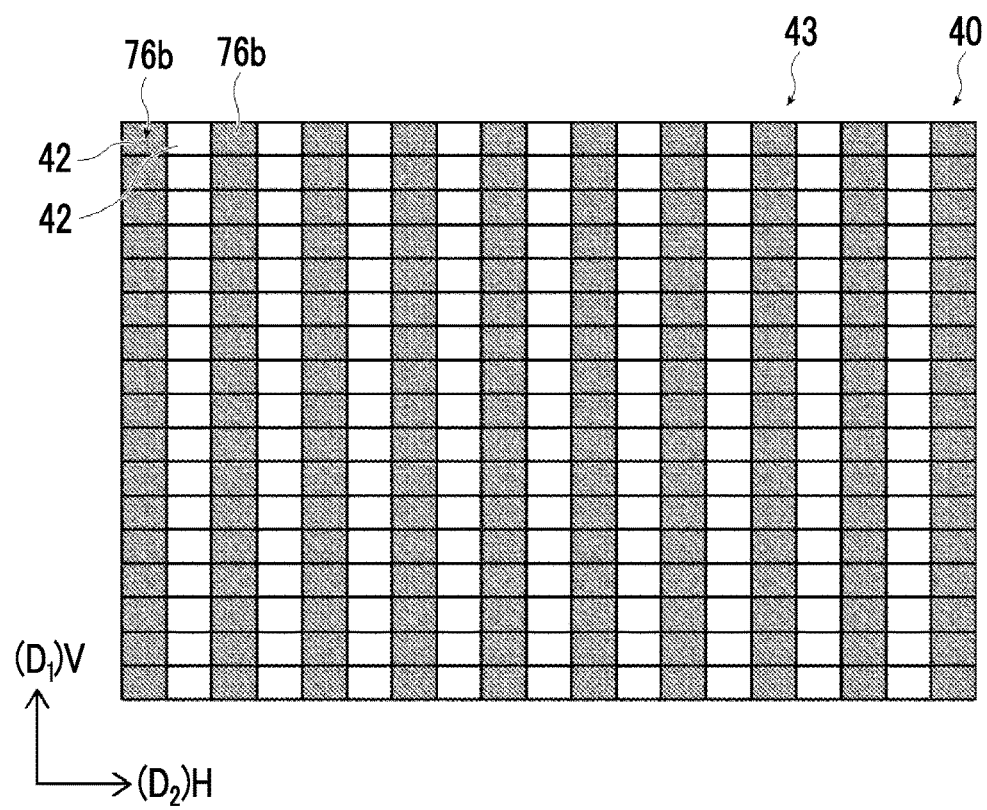
FIG. 7 is a schematic view showing a second example of thinning-out of the imaging element of the first example of the imaging apparatus of the embodiment of the present invention.

In the ½ thinning-out, as shown in FIG. 7, after a column 76b of a pixel 42 to be initially read out in the pixel region 43 of the imaging element 40 is read out, a column 76b of a pixel 42 advanced from the pixel 42 by one pixel in the horizontal direction H, that is, in the column direction may be read out. In this case, the resolution of ½ thinning-out is ½ of the total pixel readout. In a case of reading out pixels in a specific column direction, for example, all the pixels are read out, and the signals are converted into digital signals by the analog signal processing circuit 44. Thereafter, the control unit 46 executes signal processing of reading out pixel data of the column 76b of the pixel 42 advanced from pixel data corresponding to the column 76b of the pixel 42 initially read out in the column direction by one pixel in the horizontal direction H. The signal processing is repeated to obtain pixel data thinned out in the column direction. In this case, the resolution of ½ thinning-out is ½ of the total pixel readout.

[Processing by Control Unit]

Next, processing by the control unit 46 will be described. Examples of the processing by the control unit 46 include display processing, first recording processing, second recording processing, setting processing, selection processing, switching processing, recording processing, exposure amount adjustment processing, focus adjustment processing, and white balance adjustment processing.

Hereinafter, each processing described above will be described individually.

(Display Processing)

The display processing is processing of displaying various videos on the display screen of the display 28. For example, in a case where the control unit 46 starts the display processing after the imaging apparatus 10 is started, a video shown in the standard video imaged with the first angle of view by the imaging apparatus 10, that is, the standard video A1 shown in FIG. 4 is displayed at this point of time.

In a case where the setting processing is executed, the control unit 46 displays a recorded video of a recording region described below on the display screen in the display processing. In a case where the video region is switched (that is, a switching step described below is executed), the control unit 46 switches the video displayed on the display screen to a recorded video of a recording region after the switching step.

An execution operation of the display processing by the control unit 46 described above corresponds to a display step. In the embodiment, the video displayed on the display 28 through the display processing is a live video (live view image) that is imaged in real time at this point of time.

(First Recording Processing)

In the imaging apparatus 10, the control unit 46 includes a first mode and a second mode as a video imaging mode.

The first recording processing is processing of recording video data of the standard video with the first angle of view using the imaging element 40 in the first mode.

(Second Recording Processing)

The second recording processing is processing of recording video data of the recorded video of the recording region with the second angle of view smaller than the first angle of view in the second mode.

The processing of recording video data in the first recording processing and the second recording processing will be described in the recording processing described below.

(Setting Processing)

The setting processing is processing of setting the recording region with the second angle of view smaller than the first angle of view in the standard video in the second mode.

Figure 8:
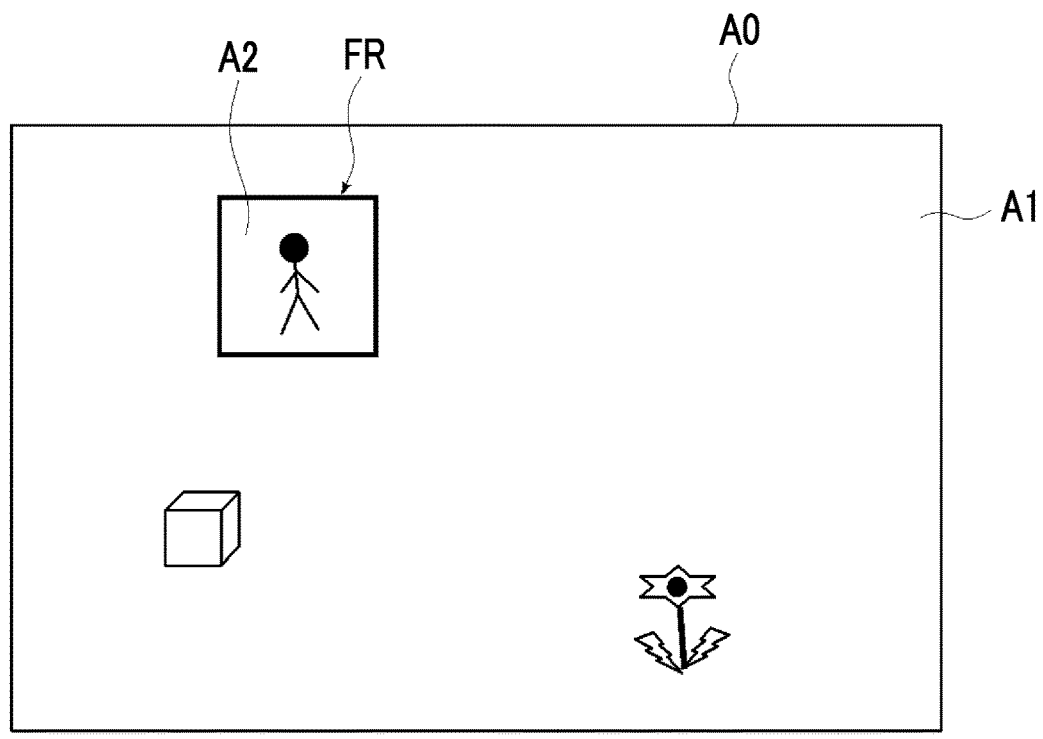
FIG. 8 is a schematic view showing a procedure of setting a recording region in the standard video by the imaging apparatus of the embodiment of the present invention.

At the time of the setting processing, the user performs an operation to set the recording region in the standard video. The setting operation will be specifically described referring to FIG. 8. FIG. 8 shows a procedure for setting the recording region in the standard video by the imaging apparatus of the embodiment of the present invention.

As shown in FIG. 8, the user performs the setting operation in a state in which the standard video A1 is displayed on the display screen of the display 28. Specifically, in a case where the user performs a predetermined button operation in a state in which the standard video A1 is displayed, as shown in FIG. 8, for example, a rectangular region setting frame FR is displayed on the standard video A1 in a superimposed manner. A video region A2 surrounded by the region setting frame FR is a region of a video that is extracted from the standard video A1. An angle of view of the extracted video is the angle of view of the recording region and is the second angle of view. The second angle of view is an angle of view smaller than the first angle of view of the standard video A1.

Figure 9:
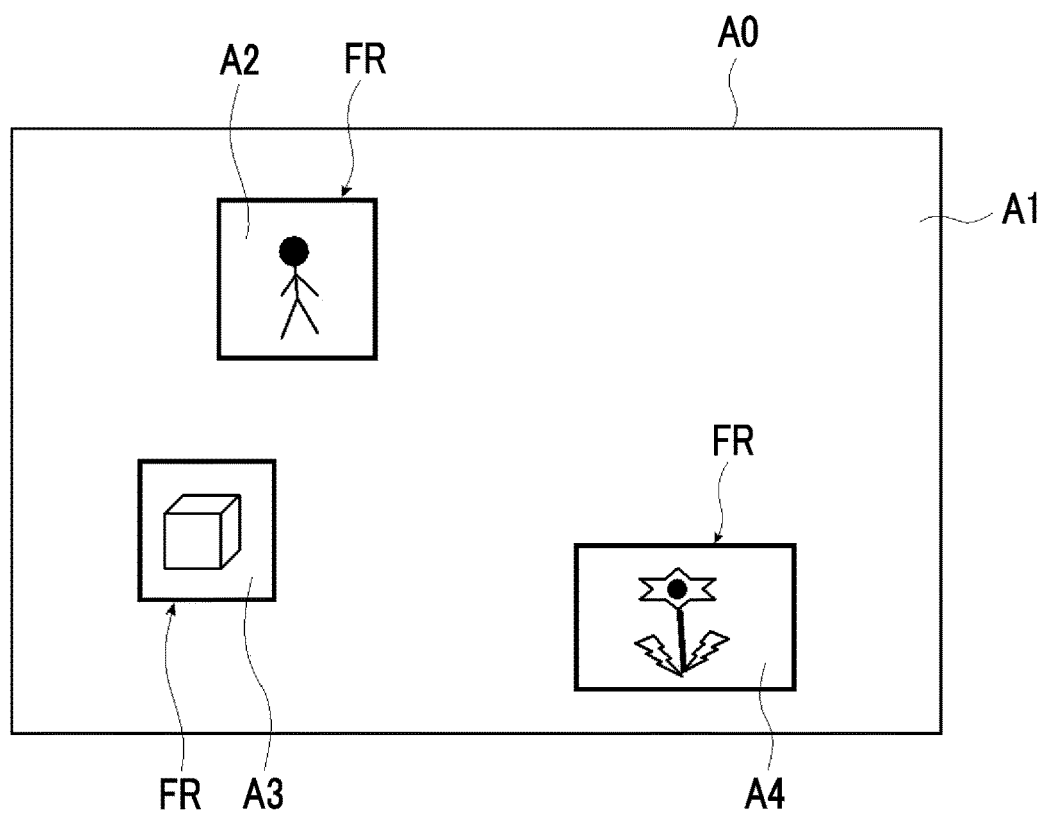
FIG. 9 is a schematic view showing a state in which a plurality of video regions are set in the standard video by the imaging apparatus of the embodiment of the present invention.

The region setting frame FR is displayed in a state in which a position, a size, and an aspect ratio are variable. FIG. 9 shows a state in which three video regions of a video region A2, a video region A3, and a video region A4 are set in the standard video A1.

In a case where a plurality of video regions are set in the standard video A1, the second angle of view of each of the video regions A2, A3, and A4, that is, the size may be the same among the video regions A2, A3, and A4 or may be different among the video regions A2, A3, and A4.

The number of set video regions is not particularly limited, but may be plural, and in the embodiment, is 3.

In a case where the user's setting operation is repeated multiple times, the control unit 46 receives each setting operation and sets the number of video regions A2 corresponding to the number of setting operations in the standard video A1 of the imaging region A0. Such an operation of the control unit 46 corresponds to a setting step.

In the standard video, processing of extracting the set recording region from the standard video is referred to as extraction processing. The extracted video is also referred to as a clop video or a cut video, and is a recording target in the second recording processing. Extracting the recording region from the standard video is also referred to as cutting.

(Selection Processing and Switching Processing)

The selection processing is processing of selecting a video region where a video to be recorded is shown, from among a plurality of video regions A2, A3, and A4 set in the standard video A1 of the imaging region A0.

The switching processing is processing of reselecting a video region from among a plurality of video regions A2, A3, and A4 to switch the video region after the selection processing.

A procedure of the selection processing and the switching processing will be described. The user performs the above-described setting operation to set a plurality of video regions A2, A3, and A4, and then, selects any one of the video region A3 or A4 as a video region. Thereafter, the user inputs video region A2 selected through a first operation button 30, a second operation button 32, a third operation button 34, the touch panel 36, or the like shown in FIG. 2, and the control unit 46 (see FIG. 3) receives the input operation. The control unit 46 decides the video region from among a plurality of video regions A3 and A4 based on the user's input operation. Such an operation by the control unit 46 corresponds to a selection step.

In a case where the user reselects the video region A2 to another video region A3 to perform an input operation again after the selection step, the control unit 46 receives the re-input operation and switching the previously selected video region to another video region A3 based on the re-input operation. Such an operation by the control unit 46 corresponds to a switching step.

Figure 10:
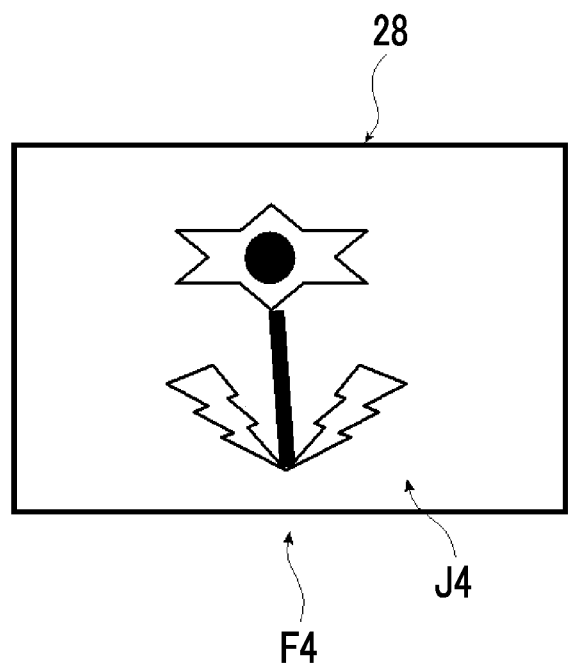
FIG. 10 is a schematic view showing a recorded video of a recording region displayed on a display screen of a display of the imaging apparatus of the embodiment of the present invention.

As described above, in the embodiment, the recording region is selected from among a plurality of video regions A2 to A4 in the selection step, and the recorded video of the recording region is recorded as a video file. In a case where the selection step is executed, for example, a subject of the video region A4 selected as a recording region F4 is displayed as a recorded video J4 on the display screen of the display 28 of the imaging apparatus 10 in conjunction with the execution of the selection step as shown in FIG. 10. FIG. 10 shows the recorded video J4 of the recording region displayed on the display screen of the display 28 of the imaging apparatus 10.

The switching step is executed after the selection step, whereby it is possible to switch a recording region to change the recorded video of the recording region to be recorded from a video of a certain subject to a video of another subject. With this, for each of a plurality of subjects in the same scene (place), it is possible to image an individual video (in detail, a video that is a close-up of each subject) with one imaging apparatus 10 without using a plurality of apparatuses.

It is also possible to switch the video region A2 where the video to be recorded is shown, in time series depending on the user's operation, and to easily acquire a video file in which videos before and after switching are shown.

In conjunction with the execution of the switching step, the video displayed on the display screen of the display 28 is switched from the recorded video of the recording region before the switching step to the recorded video of the recording region after the switching step. With this, it is possible to allow the user to confirm the switching of the video region on the display screen.

(Recording Processing)

The recording processing is processing in which the control unit 46 records the optical image of the standard video with the first angle of view and the recorded video of the recording region on the recording medium and creates the video file (in detail, video data) of the video. A target of the recording processing is video data in the first recording processing of the first mode and the second recording processing of the second mode. A format of video data is not particularly limited, and for example, a known format, such as MP4, Advanced Video Codec High Definition (AVCHD), Audio Video Interleave (AVI), or MOV, can be used.

An operation of the control unit 46 to record the recorded video of the recording region in the recording processing corresponds to a recording step. An operation of the control unit 46 to create a video file in the recording processing corresponds to a creation step. In the embodiment, video recording and video file creation, that is, video data creation are synonymous, and the creation step corresponds to the recording step.

Figure 11:
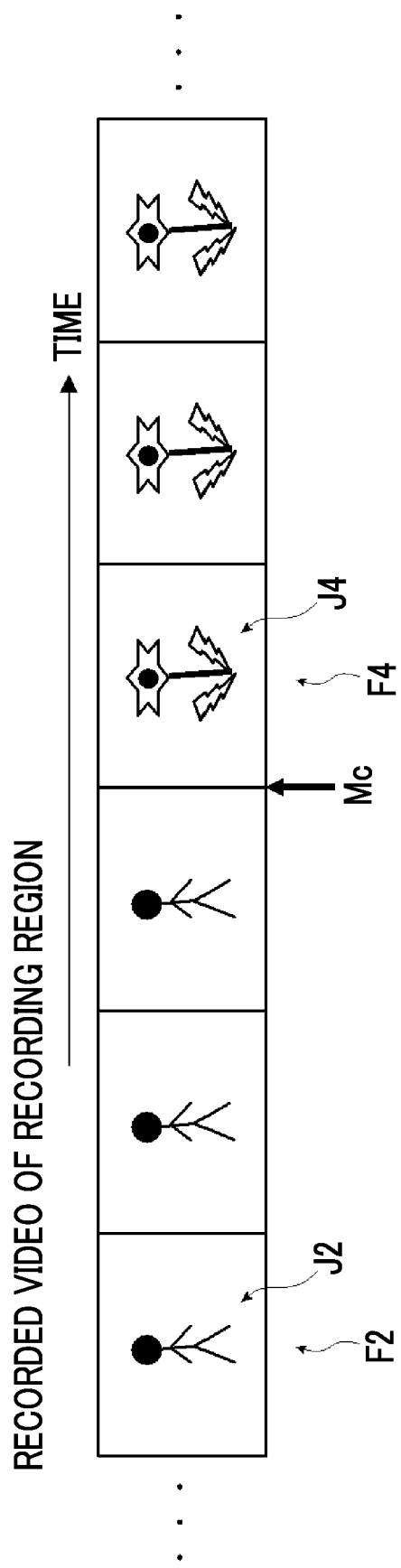
FIG. 11 is a schematic view showing an example of a recorded video of a recording region based on video data by the imaging apparatus of the embodiment of the present invention.

In a case where the switching step is executed, the control unit 46 may record each of the recorded video of the recording region before the switching step and the recorded video of the recording region after the switching step to create a video file. In this case, the control unit 46 combines the recorded video (motion image) of the recording region before the switching step and the recorded video (motion image) of the recording region after the switching step to create video data as a video file in the creation step. With this, video data of a video in which a subject changes with switching of the video region is acquired. A subject of the video region A2 selected as a recording region F2 is displayed as a recorded video J2 as shown in FIG. 11, for example, a subject of the video region A4 selected as the recording region F4 is displayed as a recorded video J4 at a timing Mc of switching of the recording region, and the display is changed. Here, FIG. 11 is a schematic view showing an example of a recorded video of a recording region based on video data by the imaging apparatus of the embodiment of the present invention. While the video region is being displayed, for example, the entire image may be inserted and displayed. That is, after the timing Mc of switching and before the display of the recorded video of the video region A4, for example, the standard video A1 shown in FIG. 9 may be displayed.

An appropriate value (appropriate exposure amount) of the exposure amount of the video region changes depending on which of a plurality of video regions A2, A3, and A4 set in the standard video A1 of the imaging region A0 is selected. For this reason, it is preferable that the appropriate exposure amount of each of the video regions A2, A3, and A4 in the standard video A1 is specified in advance before the switching step. With this, in a case where the video regions A2, A3, and A4 are switched, it is possible to obtain a clop video of the recording region in a short time.

Specifically, the control unit 46 decides a value of each of an exposure time (shutter speed) and a stop amount (F-Number) based on an appropriate exposure amount of a predetermined region. Such an operation corresponds to a condition decision step by the control unit 46. The value of each parameter decided in the condition decision step is a value indicating an exposure condition in imaging the standard video including the recorded video of the recording region.

In the embodiment, although the values of both the exposure time and the stop amount are decided, the present invention is not limited thereto, and only the value of any one of the exposure time or the stop amount may be decided.

After deciding the value of each of the exposure time and the stop amount, the control unit 46 decides a value of sensitivity (ISO sensitivity) of the pixel 42 corresponding to the video region of the recording region depending on a combination of the values. Strictly, a gain (amplification ratio) for the pixel signal of the pixel 42 corresponding to the video region of the recording region is decided.

The gain may be, for example, an analog gain to an analog signal in the analog signal processing circuit 44 or the like or may be a digital gain to a digital signal after digital conversion in the video processing unit 48 or the like.

Then, after the exposure time, the stop amount, and the sensitivity are decided, the control unit 46 shown in FIG. 3 controls the stop drive unit 23, the imaging element 40, the video processing unit 48, and the like such that the parameters have the decided values.

Though the procedure described above, while a video is being recorded, the exposure amount adjustment processing is repeatedly executed regularly (for example, for each frame). Then, the values of the exposure time, the stop amount, and the sensitivity are decided each time the exposure amount adjustment processing is executed.

In a period during which a video is recorded, the exposure amount adjustment processing may be repeatedly executed regularly. In this case, the exposure time and the stop amount in the exposure conditions change over time, and accordingly, the exposure amount in imaging the standard video is adjusted over time.

In conjunction with the changes in the exposure time and the stop amount, the sensitivity of the pixel 42 corresponding to the recording region changes over time. As a result, the exposure amount of the recording region is adjusted over time.

In the embodiment, the expression "adjusted over time" means that an adjustment amount is decided regarding a parameter to be adjusted for each frame and each parameter is increased and decreased by the adjustment amount for each frame. For a reduction of a load on the control unit, the exposure amount adjustment processing may be executed in conjunction with the switching step.

(Focus Adjustment Processing)

The focus adjustment processing is processing in which the control unit 46 performs control such that the focusing drive unit 22 automatically adjusts the focus of the imaging lens 14 in an autofocus mode. For the focus adjustment in the autofocus mode, a known autofocus technique can be used. Specific examples of the known autofocus technique include contrast autofocus, image plane phase difference autofocus, directional light beam autofocus, and Depth-from-Defocus type autofocus. Any one of such autofocus methods may be employed or a plurality of methods may be employed in combination.

In the imaging apparatus 10, during imaging of a video, the recording region with the second angle of view can be moved over time in the standard video A1 with the first angle of view. Here, the expression "moved over time" means that the recording region is relatively moved with respect to the standard video A1 such that the position of the recording region is gradually changed, and can also include a case where the movement is stopped (interrupted) halfway. Hereinafter, a case where the video region A2 is selected as the recording region F2 will be described.

Figure 12:
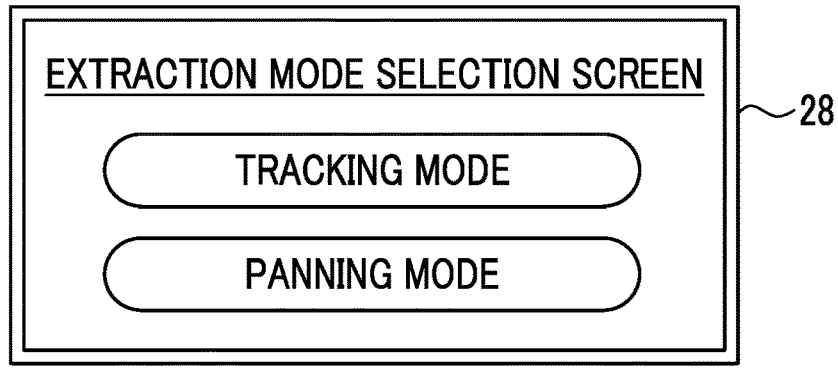
FIG. 12 is a schematic view showing an extraction mode selection screen of the imaging apparatus of the embodiment of the present invention.

Movement over time of the recording region F2 is realized by the video processing unit 48. Specifically, in a case where the user selects one mode through an extraction mode selection screen shown in FIG. 12, the video processing unit 48 moves in the standard video A1 with the first angle of view along a moving path depending on the selected mode. FIG. 12 shows the extraction mode selection screen displayed on the display 28 of the imaging apparatus 10.

More specifically, for example, two extraction modes are prepared. One mode is a mode (hereinafter, referred to as a tracking mode) where the recording region F2 is moved to track a subject to be tracked. Another mode is a mode (hereinafter, referred to as a panning mode) where the recording region F2 is moved in a given direction.

Figure 13:
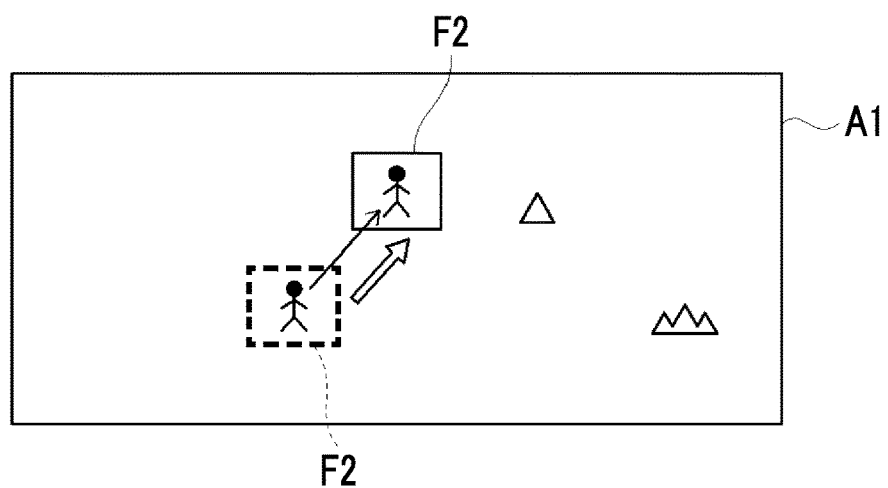
FIG. 13 is a schematic view showing a moving path of an extraction range in a tracking mode of the imaging apparatus of the embodiment of the present invention.

In a case where the tracking mode is selected, the video processing unit 48 moves the recording region F2 representing a video of a subject to track the subject to be tracked. A procedure will be described. In a case where the tracking mode is selected, and in a case where the user designates the recording region F2 representing the video of the subject in the standard video A1 with the first angle of view by a touch operation or the like on the screen, the video processing unit 48 sets the subject as a tracking target. Hereinafter, the video processing unit 48 moves the recording region F2 such that the subject to be tracked falls within the recording region F2 as shown in FIG. 13. FIG. 13 shows a moving path of the recording region F2 in a case where the tracking mode of the imaging apparatus 10 is selected.

With this, in a case where the tracking mode is selected, as long as the subject to be tracked is present in the standard video A1 with the first angle of view, the standard video A1 with the first angle of view in which the subject to be tracked is shown can be constantly displayed on the display 28. The user does not need to move the imaging apparatus 10 personally to track the subject. For this reason, there is no manual change of the angle of view, and it is possible to avoid disorder (video blur or the like) of a video due to the manual change of the angle of view. Such an effect is particularly effective in a case where imaging is performed with an angle of view in a case where the anamorphic lens is used.

An algorithm for searching for a subject to be tracked in the standard video A1 with the first angle of view is not particularly limited. As an example, an image of a subject set as a tracking target is stored as a template image in the buffer 56 (see FIG. 3), and a known template matching technique is applied to compare the template image with the standard video. Then, as a result of the comparison, a video of a portion matching the template image may be specified.

Figure 14:
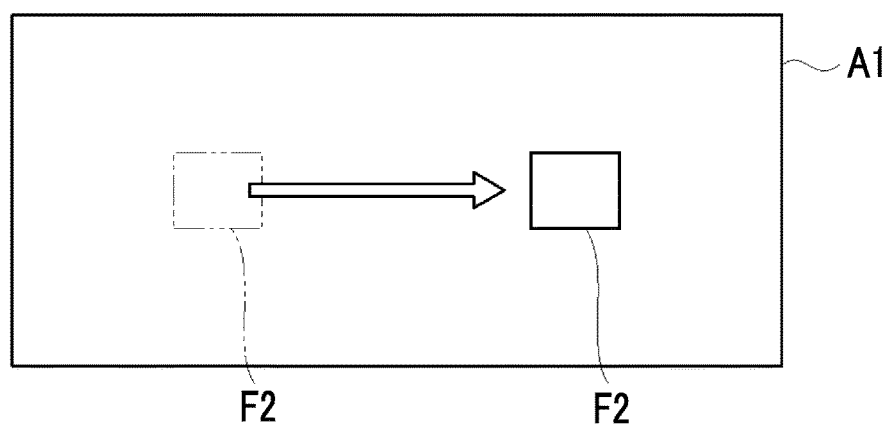
FIG. 14 is a schematic view showing a moving path of an extraction range in a panning mode of the imaging apparatus of the embodiment of the present invention.

In a case where the panning mode is selected, the video processing unit 48 slides and moves, that is, pans the recording region F2 in a given direction (for example, a lateral direction of the standard video A1 of the first angle of view). A procedure will be described. In a case where the panning mode is selected, the user sets a start position, a moving direction, a moving speed, and the like of the recording region F2 on a setting screen (not shown) of the display 28. Thereafter, as shown in FIG. 14, the video processing unit 48 automatically pans the recording region F2 from the set start position in the set direction at the set speed. FIG. 14 shows a moving path of the recording region F2 in a case where the panning mode of the imaging apparatus 10 is selected.

With the above, in a case where the panning mode is selected, a video in which an imaging angle seems to be continuously changed in a given direction, in other words, a panorama video can be displayed on the display 28. The user does not need to move the imaging apparatus 10 personally to change the angle. For this reason, there is no manual change of the angle of view, and it is possible to avoid disorder (video blur or the like) of a video due to the manual change of the angle of view. Such an effect is particularly effective in a case where imaging is performed with an angle of view in a case where the anamorphic lens is used.

Incidentally, although contents that are initially set are normally employed on setting items regarding the recording region F2, for example, a size, the aspect ratio, an area ratio, and a moving speed during movement, the user can optionally set the setting items on a setting screen (not shown) of the display 28.

Here, the aspect ratio of the recording region F2 is an aspect ratio of the standard video A1 with the first angle of view, and is strictly a ratio of the numbers of pixels in the longitudinal direction and the lateral direction. The area ratio of the recording region F2 is an area ratio of the recording region F2 to the standard video A1 with the first angle of view. The moving speed of the recording region F2 is the number of pixels through which the recording region F2 during movement passes for a unit time in a case where the angle of view is divided in units of pixels.

<Imaging by First Example of Imaging Apparatus>

Next, imaging using the imaging apparatus 10 having the functions described above will be described.

Figure 15:
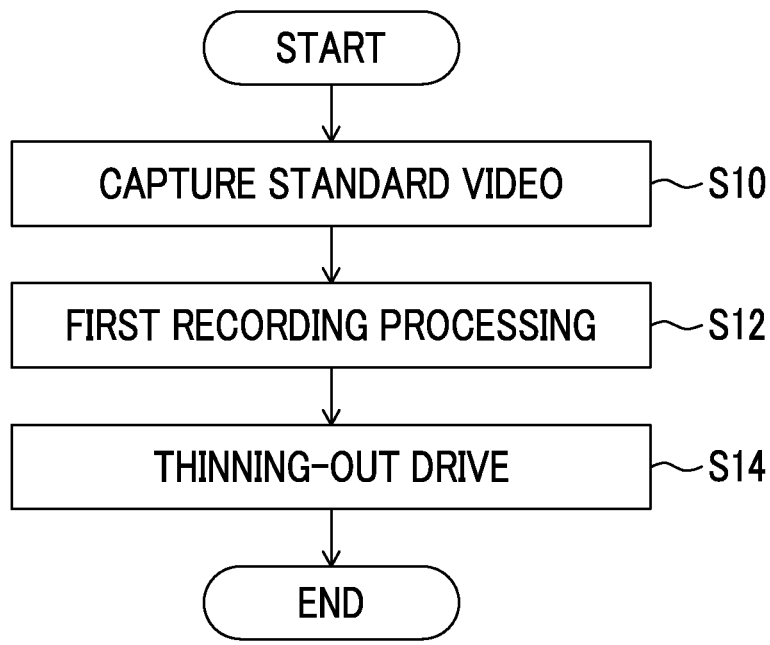
FIG. 15 is a flowchart illustrating a first mode of the imaging apparatus of the embodiment of the present invention.
Figure 16:
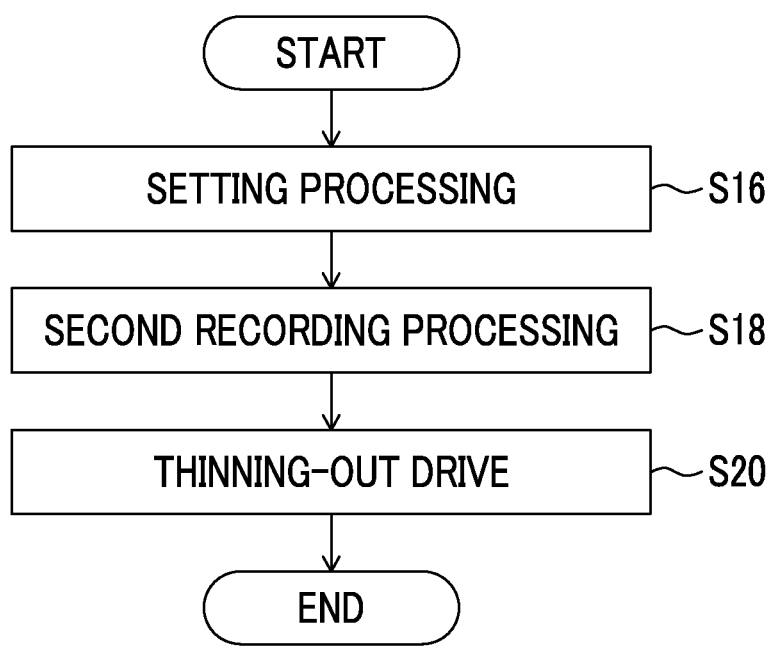
FIG. 16 is a flowchart illustrating a second mode of the imaging apparatus of the embodiment of the present invention.

FIG. 15 is a flowchart illustrating the first mode of the imaging apparatus of the embodiment of the present invention, and FIG. 16 is a flowchart illustrating the second mode of the imaging apparatus of the embodiment of the present invention.

As described above, the control unit 46 of the imaging apparatus 10 includes the first mode and the second mode as the video imaging mode and records video data of a video based on the optical image of the standard video with the first angle of view.

(First Mode)

In FIG. 15, in the first mode, the control unit 46 captures the optical image of the standard video with the first angle of view with the imaging element 40 (Step S10) and executes the first recording processing of recording the video data of the standard video (Step S12). In the first recording processing of the first mode, the control unit 46 executes thinning-out drive to thin out a part of readout of a plurality of pixels in the optical image (Step S14). The first recording processing and the thinning-out drive are as described above.

(Second Mode)

In FIG. 16, in the second mode, the control unit 46 executes the setting processing (Step S16) of setting the recording region with the second angle of view smaller than the first angle of view in the standard video and the second recording processing (Step S18) of recording video data of the recorded video of the recording region. In the second recording processing of the second mode, the control unit 46 executes thinning-out drive to thin out a part of readout of a plurality of pixels in the optical image (Step S20). The second recording processing and the thinning-out drive are as described above.

In a case of executing the thinning-out drive in Steps S14 and S20, the control unit 46 sets a second thinning-out rate in the thinning-out drive (Step S20) of the second recording processing to be lower than a first thinning-out rate in the thinning-out drive (Step S14) of the first recording processing. That is, in the second recording processing, the number of pixels to be read out is greater than in the first recording processing. Specifically, in FIG. 6, in the thinning-out drive of the first recording processing, three image columns are set as a unit in the first direction $D_1$ of the pixel region 43, and two image columns in the three image columns are read out. In the thinning-out drive of the second recording processing, four image columns are set as a unit in the first direction $D_1$ of the pixel region 43, and three image columns in the four image columns are read out.

(Change in Second Thinning-Out Rate)

Figure 17:
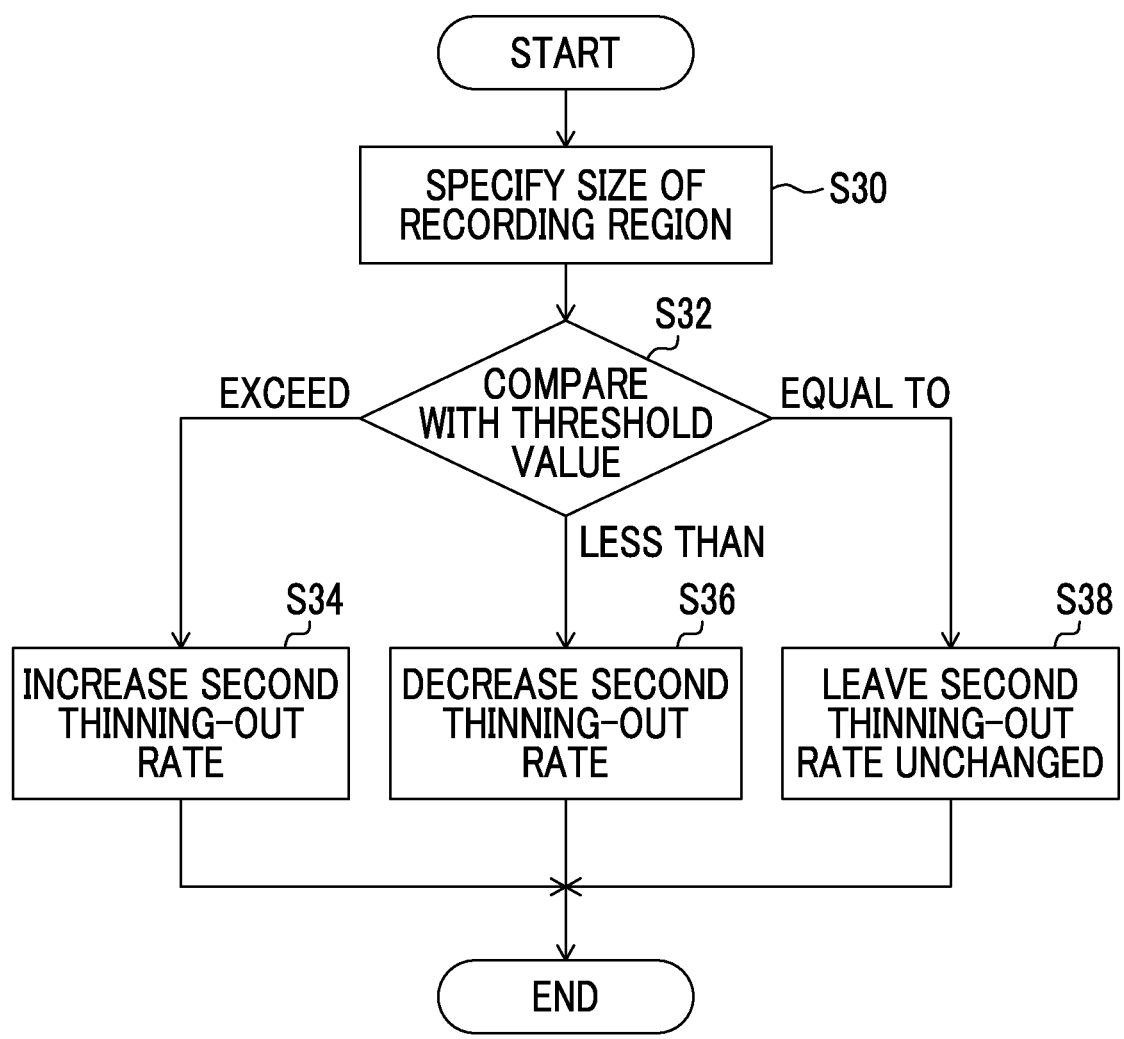
FIG. 17 is a flowchart illustrating a method of changing a second thinning-out rate of the second mode of the imaging apparatus of the embodiment of the present invention.

In FIG. 17, it is preferable that the control unit 46 changes the second thinning-out rate of the recording region with the second angle of view in the second mode. While the recording region of the second angle of view is smaller than the recording region of the first angle of view, the magnitude of the second angle of view changes depending on the user's setting. In a case where the magnitude of the second angle of view changes, the total number of pixels corresponding to the second angle of view also changes. That is, in a case where the recording region is made large, the number of corresponding pixels increases, and in a case where the recording region is made small, the number of corresponding pixels decreases. In a case where the recording region is made small with the same thinning-out rate at the second angle of view without depending on the size of the recording region, there is a possibility that a sufficient resolution cannot be obtained after thinning-out. For this reason, it is preferable that the second thinning-out rate of the recording region is changed with the second angle of view. In this case, as shown in FIG. 17, the size of the recording region is specified (Step S30). The size of the recording region can be specified by the total number of pixels. A threshold value is set in advance for the size of the recording region, the size of the recording region is compared with the threshold value (Step S32), in a case where the size of the recording region exceeds the threshold value, the second thinning-out rate increases (Step S34), and in a case where the size of the recording region is less than the threshold value, the second thinning-out rate decreases (Step S36). In Step S32, in a case where the size of the recording region is equal to the threshold value, the second thinning-out rate remains unchanged (Step S38).

(Input Resolution and Output Resolution)

As described above, it is preferable that the second thinning-out rate changes depending on the size of the recording region (second angle of view). With the change in the second thinning-out rate of the control unit 46, the imaging element 40 changes an input resolution of the recorded video of the recording region that is input to the control unit 46. It is preferable that, in a case where the input resolution of the imaging element 40 is higher than an output resolution that is a recording format of the video data, the control unit 46 reduces the input resolution to match the output resolution. It is preferable that, in a case where the input resolution of the recorded video of the recording region is lower than the output resolution, the input resolution is complemented using a known complementation technique to match the output resolution. Then, the control unit 46 outputs a video file having the output resolution to the memory card 54 (see FIG. 3) to record the video file in the memory card 54.

(Notification to User)

In a case where the input resolution of the standard video is lower than a predetermined set resolution, the total number of pixels of the standard video decreases. Therefore, a clop video with a sufficient resolution cannot be obtained, and the image quality of a clop video is degraded. For this reason, it is preferable that the control unit 46 compares the input resolution with the set resolution, and in a case where the input resolution is smaller than the set resolution, increases an imaging magnification of the standard video with the zoom function of the imaging lens to increase the total number of pixels of the standard video. With this, it is possible to obtain a clop video with a sufficient resolution. Increasing the imaging magnification with the zoom function of the imaging lens to image the standard video is referred to as optical zoom processing.

The control unit 46 performs notification regarding the zoom function to the user. In this case, the notification regarding the zoom function is displayed on the display 28. The display of the notification is not particularly limited, and may be performed by, for example, characters "please use zoom function". In addition, as the display of the notification, the entire surface of the display 28 may be made to repeatedly blink in red monochrome or a plurality of colors.

(Thinning-Out Drive)

Figure 18:
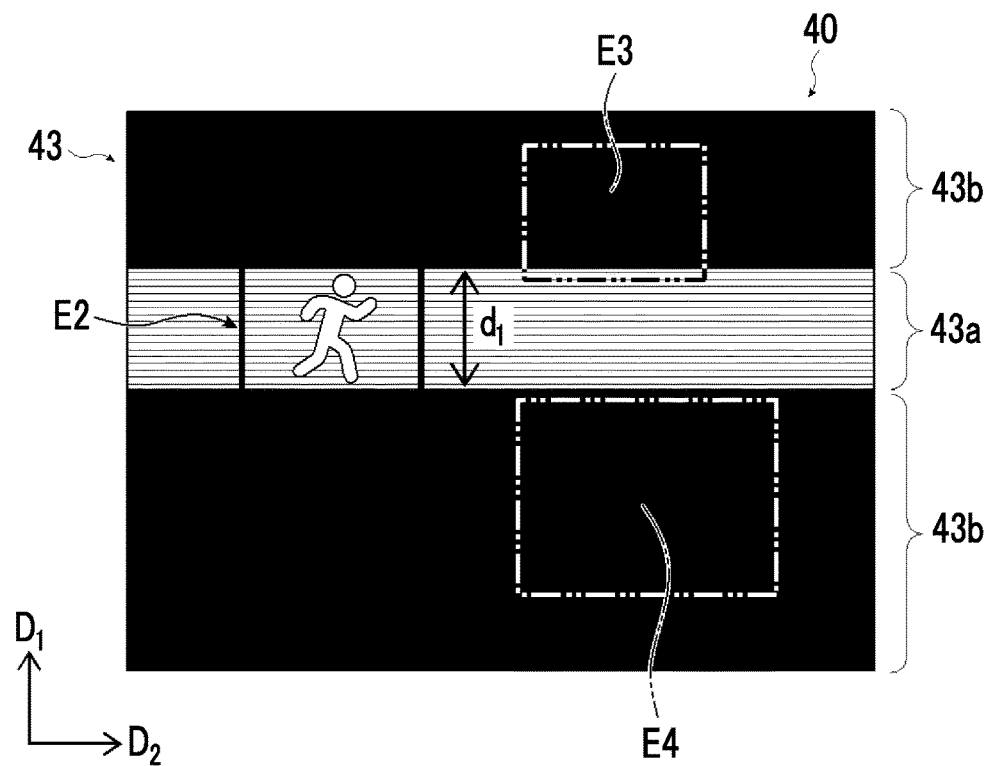
FIG. 18 is a schematic view showing a drive region and a non-drive region of the imaging apparatus of the embodiment of the present invention.
Figure 19:
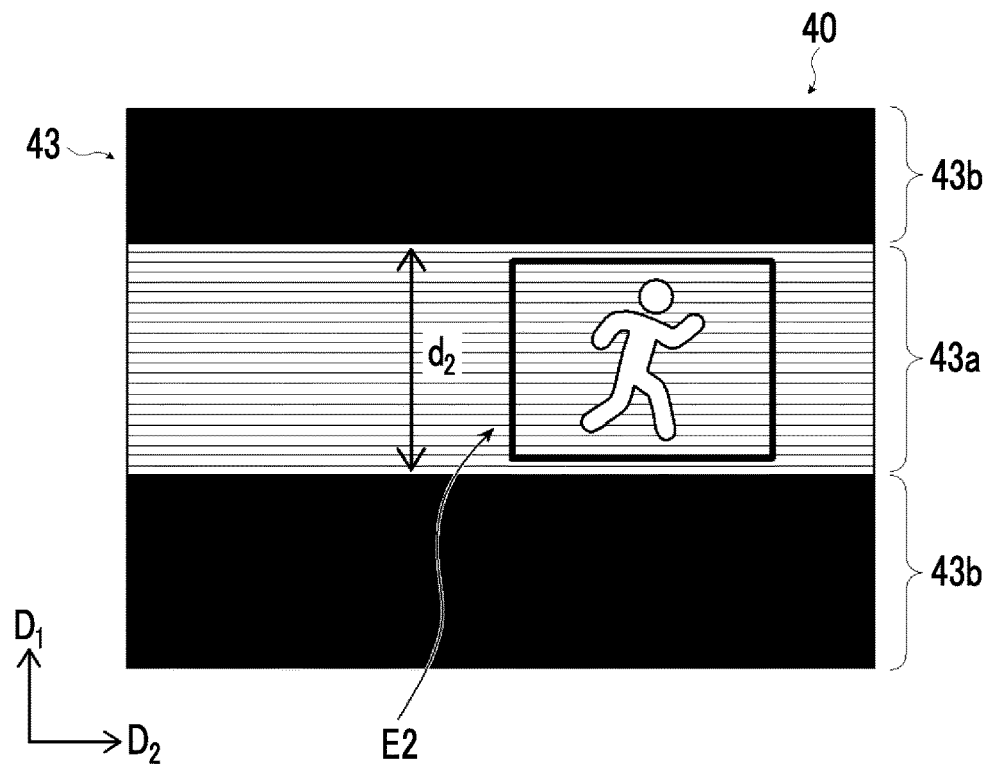
FIG. 19 is a schematic view showing drive region and a non-drive region of the imaging apparatus of the embodiment of the present invention.

In a case of executing thinning-out, as shown in FIGS. 18 and 19, the control unit 46 executes thinning-out drive to divide the pixel region 43 into a drive region 43a consisting of pixels to which the drive signal is supplied to the switch part through the first wire, and a non-drive region 43b other than the drive region 43a in the first direction $D_1$ for the imaging element 40 (see FIG. 5). It is preferable that, in the second recording processing, the control unit 46 records the video region A2 using the drive region 43a and correlates the non-drive region 43b with partial regions E3 and E4 corresponding to the video regions A3 and A4 other than the video region A2. That is, in the second recording processing, the partial region E2 of the drive region 43a of the pixel region 43 corresponding to the video region A2 is recorded as a recorded video, the pixels in the non-drive region 43b other than the drive region 43a of the pixel region 43 are not read out, and the video regions A3 and A4 are not recorded. The drive region 43a is subjected to thinning-out processing at the second thinning-out rate. The thinning-out processing reduces the number of pixels to be read out from the imaging element 40, thereby improving the processing speed of the control unit 46.

Figure 20:
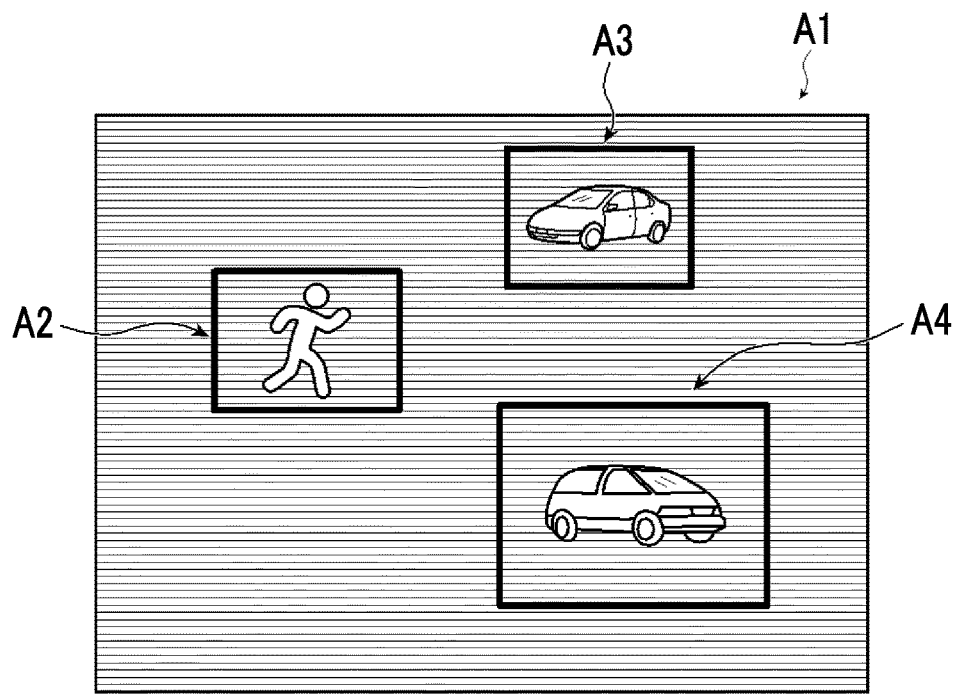
FIG. 20 is a schematic view showing a standard video as a thinning-out target obtained by the imaging apparatus of the embodiment of the present invention.

Here, FIG. 20 is a schematic view showing the standard video A1 to be thinned out, and for example, three video regions A2 to A4 are set. The partial region E2 shown in FIG. 18 is a region corresponding to the video region A2 shown in FIG. 20, the partial region E3 shown in FIG. 18 is a region corresponding to the video region A3 shown in FIG. 20, and the partial region E4 shown in FIG. 18 is a region corresponding to the video region A4 shown in FIG. 20.

It is preferable that the control unit 46 moves the position of the recording region in the standard video or changes the second angle of view of the recording region following the movement of the subject in the recording region in the second recording processing, and the control unit 46 changes a position or a width of the drive region in the pixel region following the movement of the position of the recording region or the change in the second angle of view.

In a case where one of a plurality of video regions is specified as the recording region, and in a case where the subject moves, at least one of the position of the recording region or the size of the recording region changes. That is, at least one of the second angle of view or the position of the second angle of view changes. For example, in FIGS. 18 and 19, the video region A2 moves, and the size of the video region A2 differs. The video region E2 of FIG. 19 is greater than the video region A2 of the FIG. 18, and a width $d_2$ of the drive region 43a in the first direction $D_1$ of FIG. 19 is wider than a width $d_1$ of the drive region 43a in the first direction $D_1$ of FIG. 18.

In a case where the subject moves, the width $d_1$ of the drive region 43a in the first direction $D_1$ may be set to be wider than the width $d_2$ of the specified drive region 43a in the first direction $D_1$ based on the movement of the subject. A setting position of the drive region 43a in the first direction $D_1$ and the width of the drive region 43a can also be set based on a moving speed of the subject, a moving direction of the subject, or the like. With this, since a video is read out with the angle of view greater than the video region A2, even though there is sudden movement of the subject of the video region A2, the control unit 46 can stably detect the subject.

It is preferable that the control unit 46 decides the width of the drive region 43a such that the output resolution is equal to or higher than the set resolution in a case of changing the position or the width of the drive region 43a to suppress the insufficiency of the resolution due to the thinning-out processing. It is more preferable that the output resolution is within a given range. With this, it is possible to perform imaging while securing the output resolution without depending on the size of the subject shown in the standard video. In this way, it is preferable to change a position of readout, a readout width, and the number of pixels to be read out of the pixel region 43 of the imaging element 40 in real time such that the output resolution is made constant depending on the size and the position of the recording region.

As described above, in a case where there is the movement of the subject, the above-described tracking mode is executed, whereby the control unit 46 automatically tracks the subject and the moving position and the size of the subject are specified. With this, even though the video region A2 moves, it is possible to specify the position and the width of the drive region 43*a* of the pixel region 43 corresponding to the video region A2 in real time. The thinning-out rate is also specified based on the width of the drive region 43*a* of the pixel region 43 and the output resolution.

Although the movement of the subject of the video region A2 has been described as an example, the present invention is not limited thereto. For example, the subject of each of the three video regions A2, A3, and A4 may be automatically tracked in the above-described tracking mode, and the moving position and the size of the subject may be specified to specify the position and the width of the drive region 43*a* of the pixel region 43 corresponding to the video regions A2, A3, and A4 and the thinning-out rate in real time.

Figure 21:
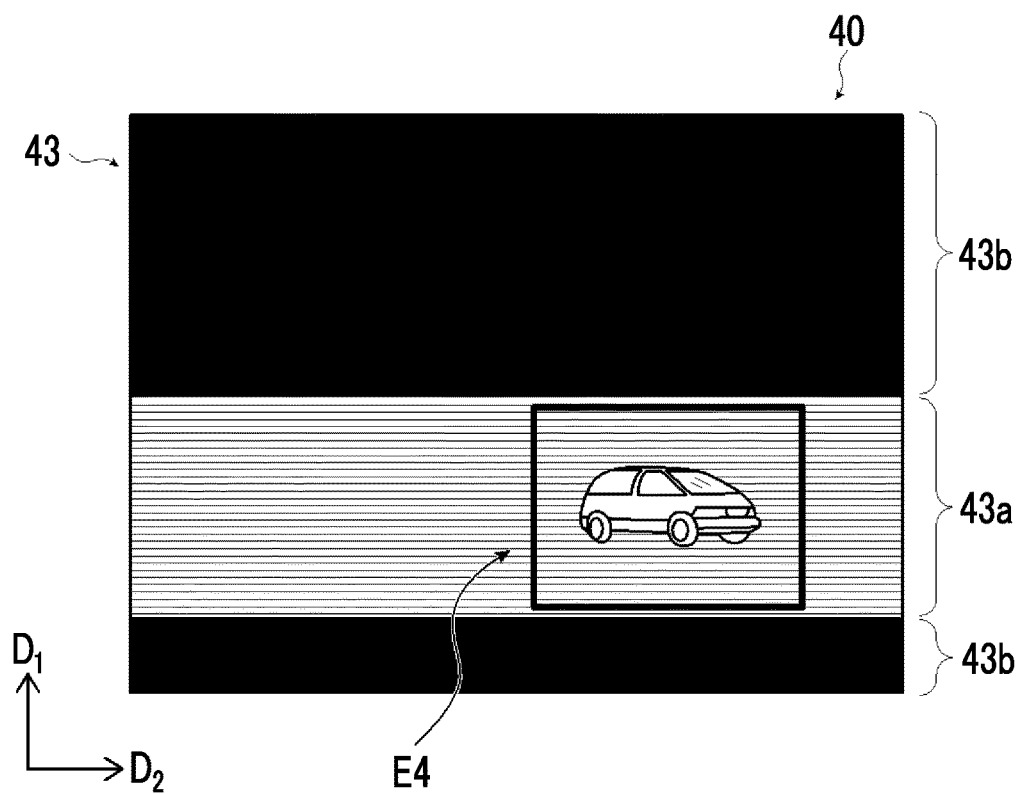
FIG. 21 is a schematic view showing a drive region and a non-drive region of the imaging apparatus of the embodiment of the present invention.

Even in a case where there is no movement of the subject, the control unit 46 sets the position and the size of each of the video regions A2, A3, and A4 shown in FIG. 20 in advance. The position and the width of the drive region 43*a* of the pixel region 43 corresponding to the video regions A2, A3, and A4 are specified. The thinning-out rate is also specified based on the width of the drive region 43*a* of the pixel region 43 and the output resolution. With this, for example, in a case of performing switching from the video region A2 to the video region A4 during video image, the drive region 43*a* of the pixel region 43 specified in advance as shown in FIG. 21 can be applied to the partial region E4 corresponding to the video region A4 to obtain the video region A4 as a recorded video.

Even in a case where there is no movement of the subject, it is preferable that the control unit 46 decides the width of the drive region 43*a* such that the output resolution is equal to or higher than the set resolution in a case of changing the position or the width of the drive region 43*a* to suppress the insufficiency of the resolution due to the thinning-out processing. It is more preferable that the output resolution is within a given range.

(Decision of Input Resolution)

In a case where the drive region 43*a* corresponds to a plurality of video regions including the recording region, it is preferable to decide the second thinning-out rate based on the smallest second angle of view among the second angles of view of the video regions. This is because, in a case where a sufficient resolution is obtained at the smallest second angle of view, even though any video region is selected as the recording region, a sufficient resolution is obtained. It is preferable that, with the second thinning-out rate at the smallest second angle of view, the input resolution is set to be higher than the output resolution. With this, there is no need to complement the input resolution to match the output resolution that is the recording format of the video file, and it is possible to improve the image quality of the video file to be recorded.

Hereinafter, the detection of movement of the subject will be described. The movement of the subject is detected by executing movement detection processing of the subject. For the detection of the movement of the subject, a known detection processing method can be used.

(Creation of Video Data)

It is preferable that the control unit 46 executes the setting processing of setting a plurality of video regions with the second angle of view in the standard video and the selection processing of selecting the recording region from a plurality of video regions in the second mode, and the second recording processing combines the recorded video before selection and a recorded video after selection in the selection processing to record video data.

In the setting processing, a plurality of video regions, for example, as shown in FIG. 20, three video regions A2, A3, and A4 are set in the standard video. Next, in the selection processing, the recording region is selected from a plurality of video regions A2, A3, and A4. For example, the video region A2 is selected as the recording region. In the second recording processing, the video region A3 before the video region A2 is selected and the video region A2 are combined to record video data. In this case, for example, video data in a form shown in FIG. 11 is obtained. That is, the video regions A2 to A4 become the recording region in a case of being selected by the user.

In a case where the video region A4 of FIG. 20 is set as the recording region, since the control unit 46 reads out only the video region A4 of FIG. 20 corresponding to the selected recording region from the pixel region 43 (see FIG. 4) and does not read out other video regions (the video regions A2 and A3 in FIG. 20) from the pixel region 43 (see FIG. 4), movement of a subject in other video regions cannot be detected. In a case where the recording region is switched from the video region A4 to the video region A2, there is a possibility that the control unit 46 records the video region A2 where the subject is not shown. Accordingly, the control unit 46 executes second recording processing having the non-drive region 43*b* (see FIG. 18) and detection processing of reading a plurality of video regions and detecting movement of a subject of each region. Then, the control unit 46 detects the position of the subject of each of the video regions A2, A3, and A4 through the detection processing to appropriately change the position and the angle of view of each of the video regions A2, A3, and A4.

For example, as shown in FIG. 21, detection processing of a detection video K (see FIG. 23) with a wide region as the drive region 43*a* is executed between two times of second recording processing with only the partial region E4 corresponding to the video region A4 as the drive region 43*a*.

Figure 22:
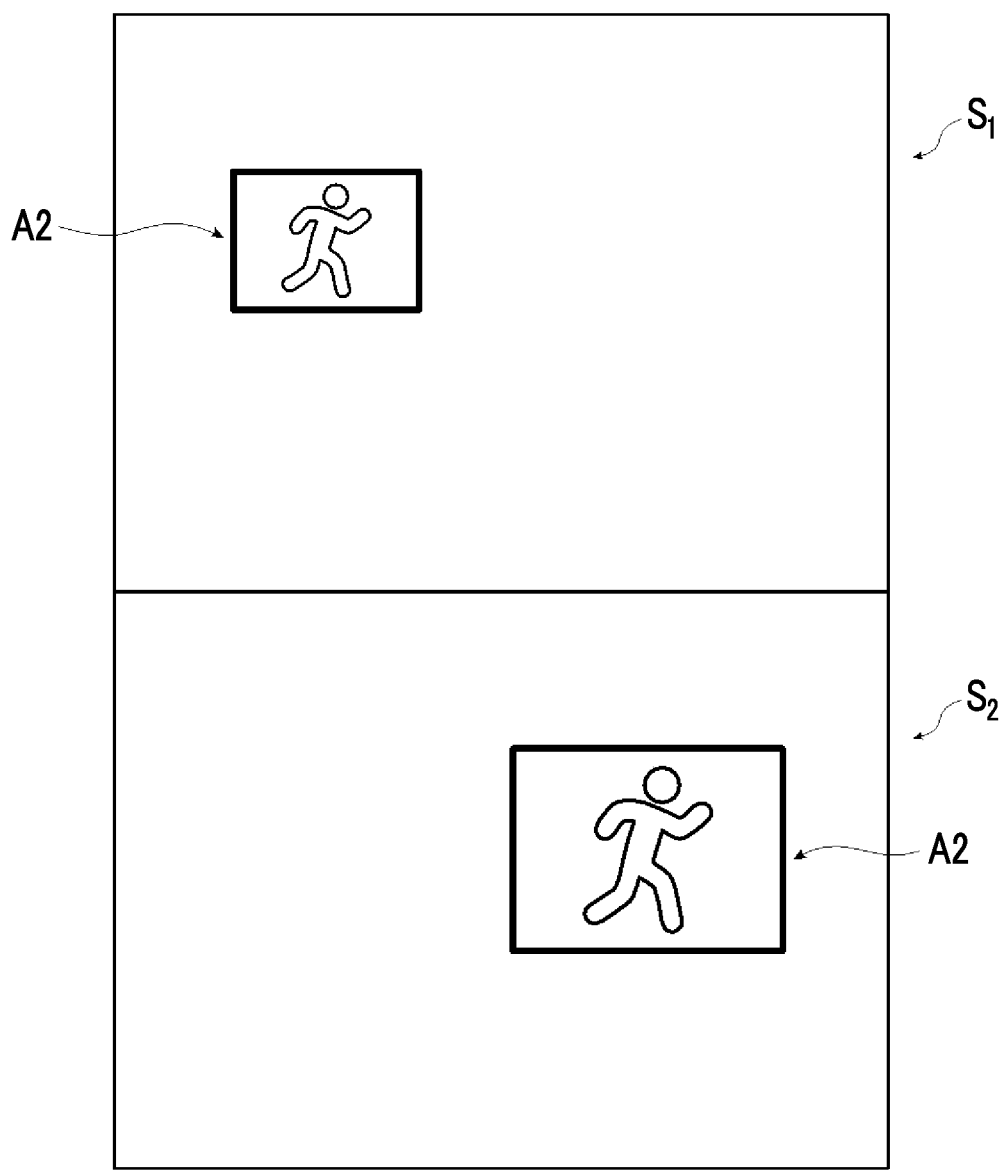
FIG. 22 is a schematic view showing an example of a video obtained by detection processing.

In the example shown in FIG. 22, in a case of comparing a video $S_1$ obtained in the first time of the second recording processing with a video $S_2$ obtained in the second time of the second recording processing, with the use of the detection processing, the position of the video region A2 (person) that is not the recording region is moving. This is because the control unit 46 detects movement of a subject of an unrecorded video region with the whole video of the detection video K (see FIG. 23).

In the detection processing, in a case where movement is not detected, in comparison between the video $S_1$ obtained in the first time of the second recording processing and the video $S_2$ obtained in the second time of the second recording processing, though not shown, the position of the video region A2 (person) that is not recording region is the same. This is because, even in this case, the control unit 46 detects movement of a subject of an unrecorded video region with the whole video of the detection video K (see FIG. 23).

The detection processing is executed for each predetermined frame, and the detection video K has a thinning-out rate higher than a thinning-out rate of a recorded video of the recording processing. As long as the position of each subject can be detected in the standard video, the detection video K with a resolution less than a predetermined resolution is allowed.

In a case of displaying the detection video K, it is preferable that the frames of the whole video are set to a frame rate higher than a common video. For example, since it is preferable that the frame rate of the detection video K is 15 to 30 frames per second (fps), it is preferable that the frame rate of the whole video is 30 to 60 fps. In this case, it is preferable that video data does not include data representing the detection video K. This is because the detection video K represents the whole imaging range and is to detect the position of each subject, recording medium, and accordingly, the detection video K does not need to be recorded on a recording medium.

The above-described tracking mode is executed using the detection video K, whereby the control unit 46 automatically tracks each of the subjects of the video regions A2, A3, and A4, and a movement position and a size of each subject are specified. The thinning-out rate of each of the video regions A2, A3, and A4 can also be decided based on the width of the drive region 43a of the pixel region 43 and the output resolution. The position and the width of the drive region 43a of the pixel region 43 and the thinning-out rate can also be specified in real time depending on the switched recording region.

Although the detection video K (see FIG. 23) is the standard video A1 or the standard video A1 having a high thinning-out rate, the present invention is not limited thereto, and the detection video K may be an image with a wider angle of view than the standard video A1. For example, the detection video K may be an image with an angle of view wider than the first angle of view including the video regions A2, A3, and A4.

Second Example of Imaging Apparatus

Figure 24:
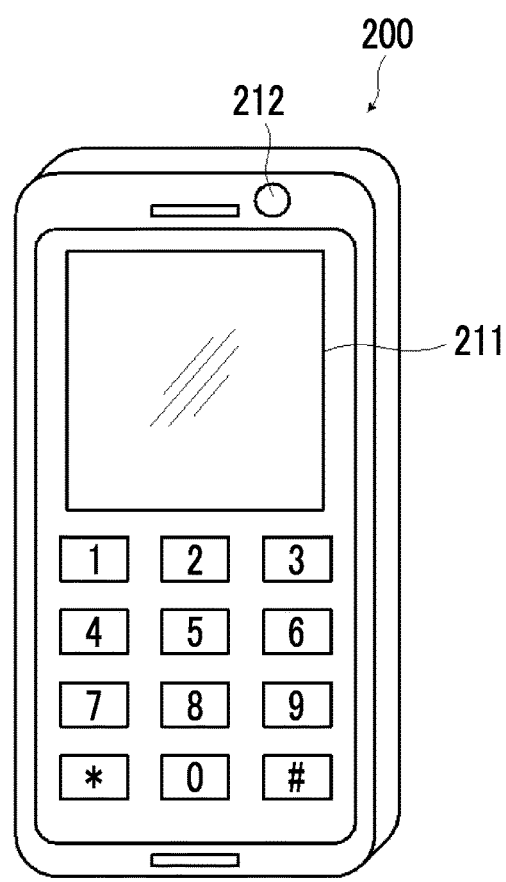
FIG. 24 is a perspective view showing a second example of the imaging apparatus of the embodiment of the present invention.
Figure 25:
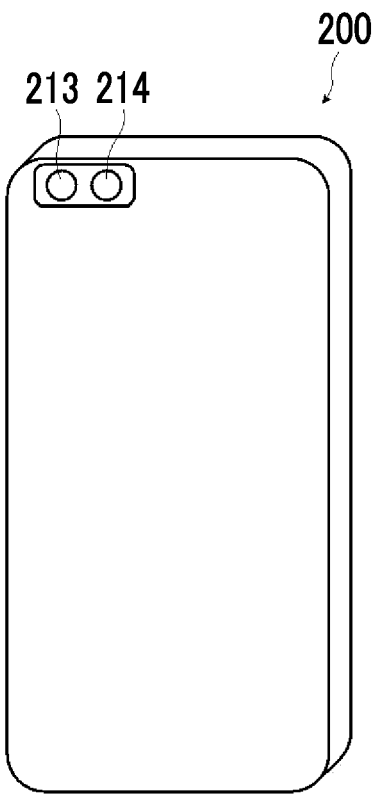
FIG. 25 is a perspective view showing the second example of the imaging apparatus of the embodiment of the present invention.
Figure 26:
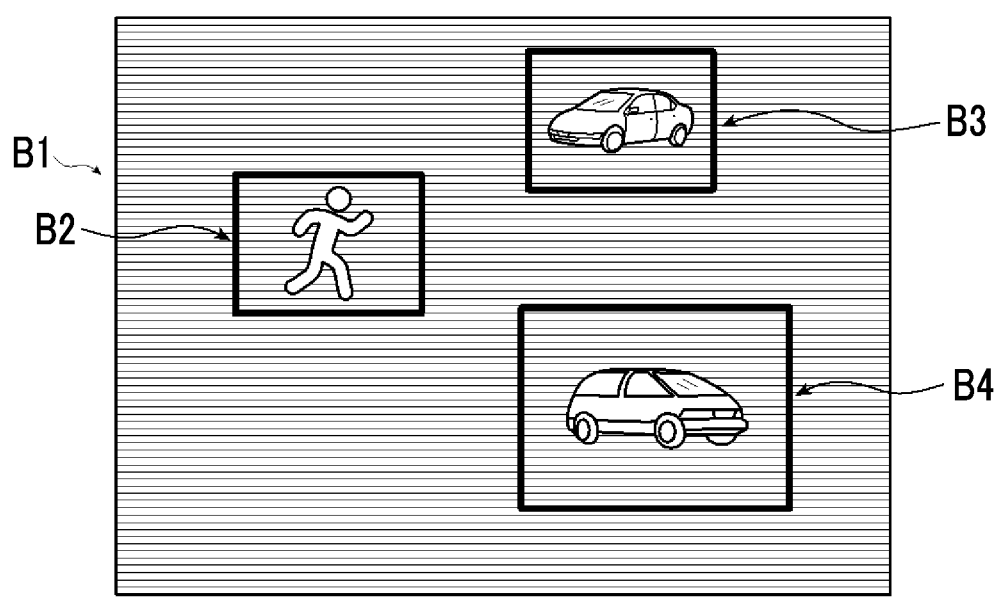
FIG. 26 is a schematic view showing a corresponding video corresponding to a standard video of the embodiment of the present invention.
Figure 27:
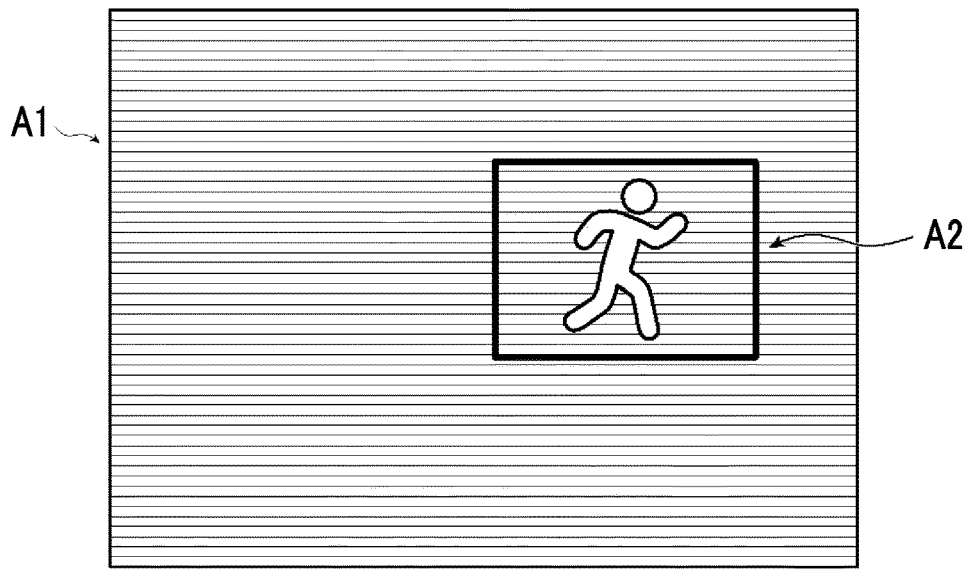
FIG. 27 is a schematic view showing another example of a standard video of the embodiment of the present invention.

FIGS. 24 and 25 are perspective views showing a second example of an imaging apparatus of the embodiment of the present invention. FIG. 26 is a schematic view showing a corresponding video corresponding to a standard video of the embodiment of the present invention, and FIG. 27 is a schematic view showing another example of a standard video of the embodiment of the present invention.

An imaging apparatus 200 shown in FIGS. 24 and 25 is a smartphone comprising a plurality of imaging units. Although detailed description of functions regarding the smartphone in the imaging apparatus 200 will not be provided, the imaging apparatus 200 can perform data communication and voice call.

The imaging apparatus 200 shown in FIGS. 24 and 25 has a front camera 212 that is provided on a surface on which a display 211 is provided, and two main cameras 213 and 214 that are provided on a surface on rear side of the surface on which the display 211 is provided. The main cameras 213 and 214 are, for example, imaging units that are provided to obtain an image of a desired imaging magnification with an optical zoom. The display 211 can have the same configuration as the display 28 in the imaging apparatus 10 shown in FIG. 3.

The main camera 213 and the main camera 214 are different in function and the like, and for example, are different in imagable angle of view. The main camera 214 can perform imaging with a wider angle of view than the main camera 213. The main camera 213 is an imaging unit that executes the first mode and the second mode, and performs normal imaging to obtain a clop video. The main camera 214 is an imaging unit that captures a wide angle image.

In the imaging apparatus 200, the main camera 213 performs imaging in the same manner as the imaging apparatus 10 and obtains, for example, the standard video A1 (see FIG. 20) including a plurality of video regions A2 to A4. The control unit 46 sets the setting position of the drive region 43a (see FIG. 21) of the pixel region 43 in the first direction $D_1$ (see FIG. 21) and the width of the drive region 43a corresponding to the set recording region from the size and the position of each of a plurality of video regions. In a case where the recording region is switched, the thinning-out rate of the switched recording region is specified based on the width of the drive region 43a of the pixel region 43 and the output resolution.

Figure 23:
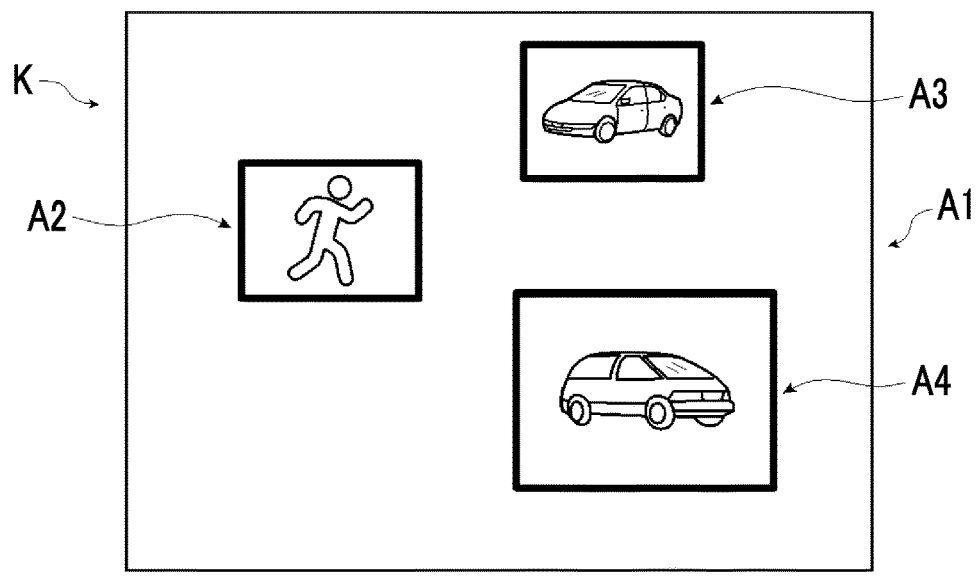
FIG. 23 is a schematic view showing an example of the detection image.

On the other hand, the main camera 214 performs imaging with a wider angle of view than the main camera 213 and obtains, for example, the above-described detection video K (see FIG. 23). From the detection video K that is obtained in the main camera 214 and include a plurality of unselected video regions among a plurality of video regions, the control unit 46 obtains the position of each of a plurality of unselected video regions from among a plurality of video regions, the size of each of the video regions, focus information, exposure information, and the like. With this, in a case where the recording region is switched among a plurality of video regions, for the recording region after switching, the position and the width of the drive region 43a of the pixel region 43 and the thinning-out rate can also be specified in real time depending on the switched recording region. With this, a video of a subject of the recording region after switching can be acquired in a short time.

For example, as shown in FIG. 20, in a case where there are three video regions A2, A3, and A4 in the standard video A1, the video region A2 is selected as the recording region and recorded in the main camera 213. On the other hand, in the main camera 214, a corresponding video B1 (see FIG. 26) corresponding to the standard video A1 of FIG. 20 is imaged, and videos of corresponding regions B2, B3, and B4 (see FIG. 26) corresponding to a plurality of video regions A2, A3, and A4 (see FIG. 20) are acquired. The position, the size, focus information, exposure information, and the like of each of the corresponding regions B2, B3, and B4 are acquired in the control unit 46. The setting position of the drive region 43a of the pixel region 43 in the first direction $D_1$ and the width of the drive region 43a are set based on the acquired information. The thinning-out rate of the recording region is specified based on the width of the drive region 43a of the pixel region 43 and the output resolution. With this, in a case where the video region A2 shown in FIG. 20 is recorded, and then, switching to another video region A3 shown in FIG. 20 is performed, the recorded video of the video region A3 at appropriate position and size and in focus can be recorded in a short time.

In the imaging apparatus 200, the main camera 213 (a first imaging element of the present invention) captures an optical image of a recorded video in each of the first recording processing and the second recording processing. The first imaging element serves for imaging the standard video and the recorded video. On the other than, the main camera 214 (a second imaging element of the present invention) acquires videos of a plurality of corresponding regions corresponding to a plurality of video regions including the recording region. The second imaging element serves to image the standard video and acquire information regarding the position and the like of each of a plurality of video regions.

The control unit 46 executes detection processing of detecting movement of a subject in each of a plurality of corresponding regions. In the detection processing, the control unit 46 makes the main camera 214 acquire a detection video with an angle of view including a plurality of the corresponding regions and moves at least one of a plurality of video regions or changes the angle of view following the movement of the subject. In this case, it is preferable that video data does not include data representing the detection video. The position of each subject over the entire imaging range is detected by the main camera 214, whereby in a case where the recording region is switched, recording can be performed in a short time after the switching of the recording region.

Movement detection is as described above. For example, a subject moves over time, the video region A2 (person) moves as shown in FIG. 27, the video region A2 increases in size, and the video region A3 and the video region A4 shown in FIG. 20 are not present. The corresponding video B1 (see FIG. 26) corresponding to the standard video A1 shown in FIG. 27 in this situation is recorded in the main camera 214, and the control unit 46 acquires a position, a size, focus information, and the like regarding the corresponding region B2 (not shown) corresponding to the video region A2. For this reason, as shown in FIG. 27, even though the position, the size, the focus information, and the like of the video region A2 are changed, the recorded video of the video region A2 can be obtained in a short time.

In the main camera 214, an image with a wider angle of view than the standard video A1 may be captured. With the use of the image with a wide angle of view, even though a moving range of the subject exceeds the range of the standard video A1 of the first angle of view, the subject can be tracked.

Third Example of Imaging Apparatus

Figure 28:
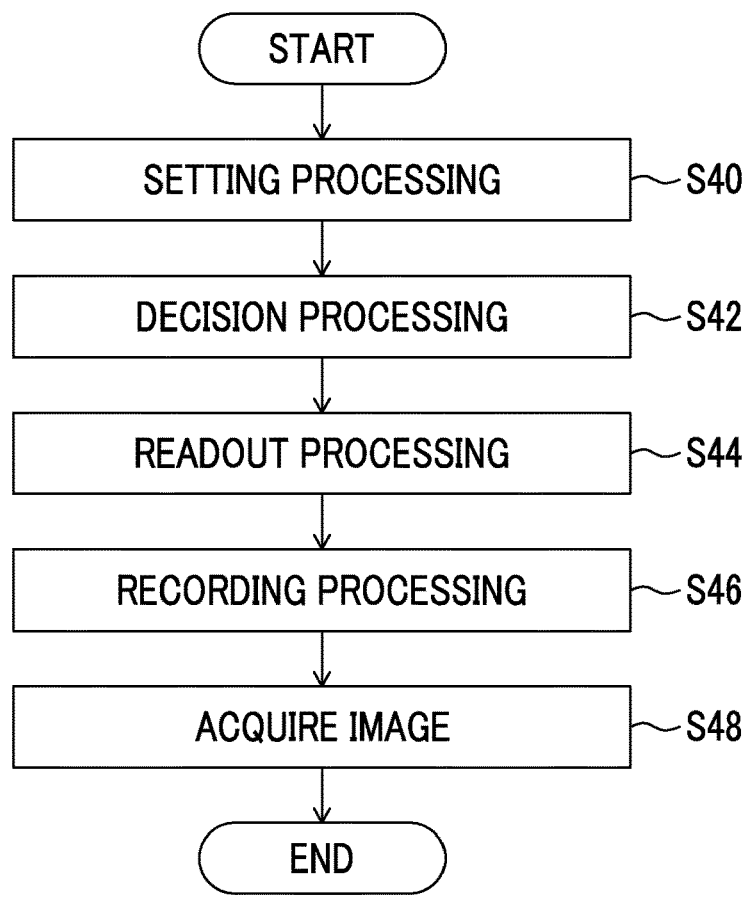
FIG. 28 is a flowchart illustrating processing of a control unit of a third example of the imaging apparatus of the embodiment of the present invention.

The apparatus configuration of a third example of an imaging apparatus is the same as the imaging apparatus 10 shown in FIG. 3 described above, excluding that processing contents of the control unit 46 are different from those in the imaging apparatus 10 shown in FIG. 3. For example, description will be described with the same reference numerals as the imaging apparatus 10 described above. FIG. 28 is a flowchart showing processing of a control unit of the third example of the imaging apparatus of the embodiment of the present invention.

In the imaging apparatus 10, the control unit 46 captures an optical image of a standard video with a first angle of view, and an imaging element having a pixel region where a plurality of pixels are arranged in a first direction and a second direction crossing the first direction records a video data of a video based on the captured optical image. The control unit 46 executes setting processing (Step S40) of setting a plurality of video regions with a second angle of view smaller than the first angle of view in the standard video, decision processing (Step S42) of deciding a recording region from among a plurality of video regions, readout processing (Step S44) of reading out a video signal of the pixel region corresponding to the recording region, and recording processing (Step S46) of recording a video data of a recorded video of the recording region. With this, the video data of the recording region can be acquired (Step S48). The control unit 46 thins out readout of the pixels in the first direction and the second direction and reads out a video signal of a partial region of the pixel region corresponding to the recording region in the readout processing (Step S44). Then, the control unit 46 records a video of a partial region as a recording target in the recording processing (Step S46).

Example of thinning-out drive in the first direction and the second direction will be described. For example, as described referring to FIG. 18, a pixel drive line 116 (see FIG. 5) of a pixel row corresponding to the partial region is driven to drive only a specific pixel row. Then, in FIG. 5, a video signal of the driven specific pixel row flows into the column processing unit 113 through the vertical signal line 117. Then, the horizontal drive unit 114 selects only a video signal of a pixel column corresponding to the partial region to supply the video signal to the signal processing unit 118. With the use of such a method, the video signal of the partial region can be read out.

Figure 29:
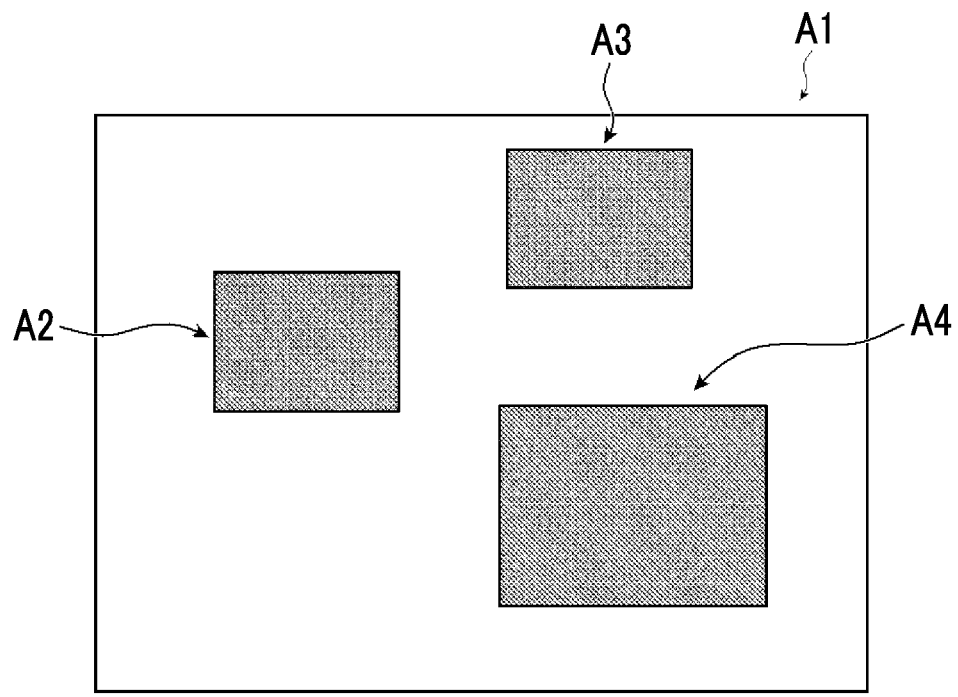
FIG. 29 is a schematic view showing a standard video as a thinning-out target of the embodiment of the present invention.
Figure 30:
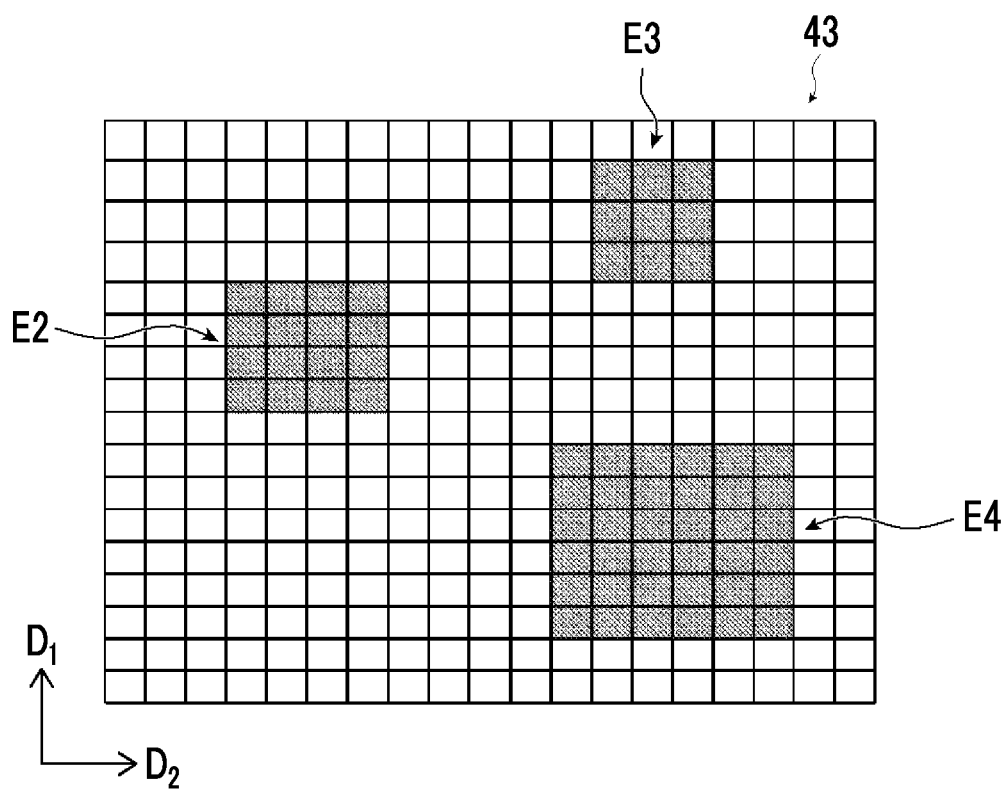
FIG. 30 is a schematic view showing correspondence between the standard video as a thinning-out target of the embodiment of the present invention and a pixel region of the imaging element.

FIG. 29 is a schematic view of a standard video A1 to be thinned out of the embodiment of the present invention. In FIG. 29, for example, three video regions A2 to A4 are set in the standard video A1 in the setting processing by the control unit 46. In a case where the standard video A1 shown in FIG. 29 is made to correspond to the pixel region 43 of the imaging element 40 shown in FIG. 5 described above, as shown in FIG. 30, a partial region E2 corresponds to the video region A2 in the pixel region 43, a partial region E3 corresponds to the video region A3, and a partial region E4 corresponds to the video region A4. That is, in a case where any one of the video regions A2 to A4 is selected as the recording region, any one of the partial regions E2 to E4 of the pixel region 43 corresponding to the selected video region of the video regions A2 to A4 is a thinned-out region in the first direction $D_1$ and the second direction D2. A position and a size of each of the partial regions E2 to E4 are specified, for example, coordinate data representing the position of the pixel 42 in the control unit 46.

The control unit 46 reads out a video signal of the pixel region corresponding to the video region decided as the recording region from among the video regions A2 to A4 set in the setting processing, from the imaging element 40. Then, at the time of reading out from the imaging element 40, the control unit 46 thins out the pixels in the first direction $D_1$ and the second direction D2 to read out the video signal of the partial region of the pixel region 43 corresponding to the recording region. Then, the control unit 46 records a video of the partial region as a recording target in the recording processing. That is, in a case where, for example, the video region A2 is decided as the recording region from among a plurality of video regions A2 to A4, the control unit 46 records video data of a recorded video of the partial region E2 corresponding to the recording region F2. In this case, the control unit 46 sets the video of the partial region E2 as a recording target and excludes the videos of other partial regions E3 and E4 from a recording target in the recording processing. With this, an image of only the recording region selected from the video regions A2 to A4 can be obtained.

The control unit 46 may change the thinning-out rate of the recording region of thinning-out drive to thin out a part of readout of a plurality of pixels with the change in the second angle of view in the readout processing. With this, it is possible to obtain a sufficient resolution regarding the recording region after thinning-out. The size of the partial region and the size of the recording region do not need to completely match, and the size of the partial region may be slightly greater than the size of the recording region.

The embodiment of the present invention basically has the configuration as above. Although the imaging apparatus of the embodiment of the present invention has been described in detail, the embodiment of the present invention is not limited to the above-described embodiment, and it is obvious that various improvements or alterations may be made without departing from the spirit of the present invention.

EXPLANATION OF REFERENCES

10: imaging apparatus
12: imaging apparatus body
13: mount
14: imaging lens
18: optical component unit
19: focusing optical component
20: stop
21: electronic light reduction filter
22: focusing drive unit
23: stop drive unit
24: voltage application unit
26: release button
28: display
30: first operation button
32: second operation button
34: third operation button
36: touch panel
38: optical shutter
40: imaging element
42: unit pixel (pixel)
43: pixel region
43a: drive region
43b: non-drive region
44: analog signal processing circuit
46: control unit
47: controller
48: video processing unit
50: internal memory
52: card slot
54: memory card
56: buffer
111: pixel array part
112: vertical drive unit
113: column processing unit
114: horizontal drive unit
116: pixel drive line
117: vertical signal line
118: signal processing unit
119: data storage unit
200: imaging apparatus
211: display
212: front camera
213, 214: main camera
A0: imaging region
A1: standard video
A2, A3, A4: video region
B1: corresponding video
B2, B3, B4: corresponding region
Ad: unit region
$D_1$: first direction
$D_2$: second direction
E2, E3, E4: partial region
F2, F4: recording region
FR: region setting frame
H: horizontal direction
J2, J4: recorded video
K: detection video
L1: optical axis
Mc: timing
$S_1$, $S_2$: video
V: vertical direction

What is claimed is:

1. An imaging apparatus comprising:
an imaging element that captures an optical image of a standard video with a first angle of view and has a pixel region where a plurality of pixels is arranged in a first direction and a second direction crossing the first direction; and
a control unit that has a first mode and a second mode as a video imaging mode and records video data of a video based on the optical image,
wherein the control unit executes first recording processing of recording video data of the standard video using the imaging element in the first mode,
the control unit executes setting processing of setting a recording region with a second angle of view smaller than the first angle of view in the standard video and second recording processing of recording video data of a recorded video of the recording region in the second mode,
the control unit executes thinning-out drive to thin out a part of readout of the plurality of pixels in the first recording processing and the second recording processing,
the control unit sets a second thinning-out rate in the thinning-out drive of the second recording processing to be lower than a first thinning-out rate of the thinning-out drive of the first recording processing, and
the control unit changes the second angle of view of the recording region following the movement of a subject in the recording region and changes the second thinning-out rate of the recording region with change in the second angle of view in the second recording process.

2. The imaging apparatus according to claim 1,
wherein the imaging element changes an input resolution of the recorded video of the recording region input to the control unit with the change in the second thinning-out rate of the control unit, and
the control unit reduces the input resolution to match an output resolution of the video data in a case where the input resolution is higher than the output resolution and complements the input resolution to match the output resolution in a case where the input resolution is lower than the output resolution.

3. The imaging apparatus according to claim 2, further comprising:
an imaging lens having a zoom function,
wherein the imaging element receives light transmitted through the imaging lens to capture the optical image of the standard video with the first angle of view, and
the control unit performs notification regarding the zoom function to a user in a case where the input resolution is lower than a set resolution.

4. The imaging apparatus according to claim 1,
wherein the control unit executes setting processing of setting a plurality of video regions with the second angle of view in the standard video and selection processing of selecting the recording region from the plurality of video regions, in the second mode, and
the second recording processing combines the recorded video before selection and the recorded video after selection in the selection processing to record video data.

5. The imaging apparatus according to claim 4,
wherein each of the pixels has a photoelectric conversion element and a switch part,
a pixel circuit including a plurality of first wires extending in the first direction and a plurality of second wires extending in the second direction is provided,
the first wires and the second wires are electrically connected to the switch parts,
the control unit supplies a drive signal to the switch parts through the first wires, such that a video signal based on the photoelectric conversion element is output to the second wires in response to the drive signal,
the control unit executes the thinning-out drive to divide the pixel region into a drive region where the drive signal is supplied to the switch parts through the first wires and that consists of the pixels and a non-drive region other than the drive region, in the first direction, and
the control unit records the recorded video using the drive region and correlates the non-drive region with the video regions other than the recording region in the second recording processing.

6. The imaging apparatus according to claim 5,
wherein the control unit moves a position of the recording region in the standard video or changes the second angle of view of the recording region following movement of the subject in the recording region in the second recording processing, and
the control unit changes a position or a width of the drive region in the pixel region following the movement of the position of the recording region or the change in the second angle of view.

7. The imaging apparatus according to claim 6,
wherein the control unit decides the second thinning-out rate based on the smallest second angle of view among the second angles of view of the plurality of video regions.

8. The imaging apparatus according to claim 4,
wherein the control unit executes detection processing of detecting movement of the subject in the plurality of video regions including the recording region,
the control unit executes the second recording processing multiple times and executes the detection processing between the plurality of times of the second recording processing, and
in the detection processing, the control unit acquires a detection video with an angle of view including the recording region and at least one video region and moves at least one of the plurality of video regions or changes the second angle of view following the movement of the subject.

9. The imaging apparatus according to claim 4,
wherein a first imaging element as the imaging element that captures the optical image of the recorded video in the first recording processing and the second recording processing and a second imaging element that is different from the first imaging element and acquires videos of a plurality of corresponding regions corresponding to the plurality of video regions including the recording region are provided,
the control unit executes detection processing of detecting movement of the subject in the plurality of corresponding regions, and
in the detection processing, the control unit performs control such that the second imaging element acquires a detection video with an angle of view including the plurality of corresponding regions and moves at least one of the plurality of video regions or changes the angle of view following the movement of the subject.

10. The imaging apparatus according to claim 8,
wherein the video data includes no data representing the detection video.

11. The imaging apparatus according to claim 1,
wherein a pixel resolution of the pixel region of the imaging element is 70,000,000 or more.

12. The imaging apparatus according to claim 2,
wherein the control unit executes setting processing of setting a plurality of video regions with the second angle of view in the standard video and selection processing of selecting the recording region from the plurality of video regions, in the second mode, and
the second recording processing combines the recorded video before selection and the recorded video after selection in the selection processing to record video data.

13. The imaging apparatus according to claim 3,
wherein the control unit executes setting processing of setting a plurality of video regions with the second angle of view in the standard video and selection processing of selecting the recording region from the plurality of video regions, in the second mode, and
the second recording processing combines the recorded video before selection and the recorded video after selection in the selection processing to record video data.

14. The imaging apparatus according to claim 4,
wherein the control unit executes setting processing of setting a plurality of video regions with the second angle of view in the standard video and selection processing of selecting the recording region from the plurality of video regions, in the second mode, and
the second recording processing combines the recorded video before selection and the recorded video after selection in the selection processing to record video data.

15. The imaging apparatus according to claim 9,
wherein the video data includes no data representing the detection video.

16. The imaging apparatus according to claim 2,
wherein a pixel resolution of the pixel region of the imaging element is 70,000,000 or more.

17. The imaging apparatus according to claim 3,
wherein a pixel resolution of the pixel region of the imaging element is 70,000,000 or more.

18. The imaging apparatus according to claim 4,
wherein a pixel resolution of the pixel region of the imaging element is 70,000,000 or more.

19. The imaging apparatus according to claim 5,
wherein a pixel resolution of the pixel region of the imaging element is 70,000,000 or more.

20. The imaging apparatus according to claim 6,
wherein a pixel resolution of the pixel region of the imaging element is 70,000,000 or more.

* * * * *